(12) United States Patent
Hashimoto

(10) Patent No.: US 10,820,388 B1
(45) Date of Patent: *Oct. 27, 2020

(54) DRIVING CIRCUITS

(71) Applicant: InnoLux Corporation, Miao-Li County (TW)

(72) Inventor: Kazuyuki Hashimoto, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/729,856

(22) Filed: Dec. 30, 2019

Related U.S. Application Data

(60) Provisional application No. 62/833,804, filed on Apr. 15, 2019.

(51) Int. Cl.
| | |
|---|---|
| *H05B 45/325* | (2020.01) |
| *H05B 45/10* | (2020.01) |
| *H05B 45/44* | (2020.01) |
| *H05B 45/327* | (2020.01) |
| *H05B 47/16* | (2020.01) |
| *G09G 3/34* | (2006.01) |

(52) U.S. Cl.
CPC ........... *H05B 45/325* (2020.01); *H05B 45/10* (2020.01); *H05B 45/327* (2020.01); *H05B 45/44* (2020.01); *H05B 47/16* (2020.01); *G09G 3/3406* (2013.01); *G09G 2320/064* (2013.01); *G09G 2320/0633* (2013.01)

(58) Field of Classification Search
None
See application file for complete search history.

(56) References Cited

U.S. PATENT DOCUMENTS

2018/0240409 A1* 8/2018 Li .................. G09G 3/3283

* cited by examiner

*Primary Examiner* — Lynda Jasmin
*Assistant Examiner* — Laura Yesildag
(74) *Attorney, Agent, or Firm* — McClure, Qualey & Rodack, LLP

(57) ABSTRACT

A driving circuit for driving a light emitting unit is provided. The driving circuit includes a current source, a PWM circuit, and an emission switch. The current source generates a current. The PWM circuit stores a data signal according to a scan signal, and generates a PWM signal according to the data signal and an enable signal. The emission switch couples the current source to the light emitting unit according to the emission signal so that the current flows through the Light emitting unit.

18 Claims, 24 Drawing Sheets

DRIVING CIRCUITS

CROSS REFERENCE TO RELATED APPLICATIONS

This application claims the benefit of U.S. Provisional Application No. 62/833,804, filed on Apr. 15, 2019, the entirety of which is incorporated by reference herein.

BACKGROUND

Field

The disclosure relates generally to circuits for driving light emitting units, and more particularly it relates to circuits for dimming the luminance of light emitting units with pulse-width modulation (PWM).

Description of the Related Art

Electronic devices have become indispensable necessities to modern people no matter in their work, study or entertainment. With a flourishing development of the portable electronic devices, the consumers not only pursue better electronic characteristics such as higher display quality, higher speed of response, longer life span or higher reliability, but also have higher expects on the functions or the stability of the products to be more diversified.

SUMMARY

In an embodiment, a driving circuit for illuminating a light emitting unit is provided. The driving circuit includes a current source, a PWM circuit, and an emission switch. The current source generates a current. The PWM circuit stores a data signal according to a scan signal and generates a PWM signal according to an enable signal and the data signal stored in the PWM circuit. The emission switch couples the current source to the light emitting unit according to the emission signal so that the current flows through the light emitting unit.

A detailed description is given in the following embodiments with reference to the accompanying drawings.

BRIEF DESCRIPTION OF DRAWINGS

The disclosure can be more fully understood by reading the subsequent detailed description and examples with references made to the accompanying drawings, wherein.

DETAILED DESCRIPTION OF THE DISCLOSURE

Figure 1:
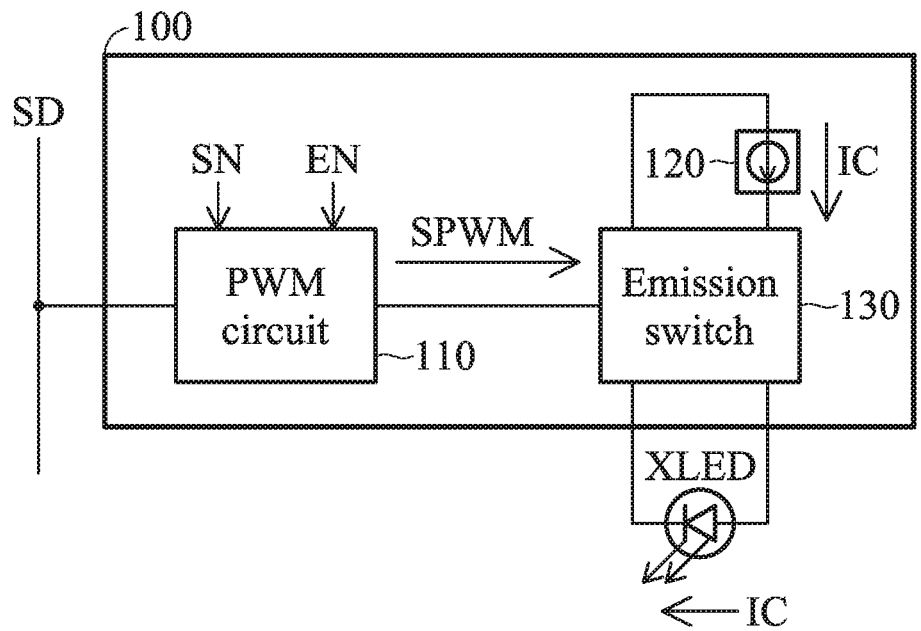
FIG. 1 is a block diagram of a driving circuit in accordance with an embodiment of the disclosure.

This description is made for the purpose of illustrating the general principles of the disclosure and should not be taken in a limiting sense.

The term "substantially" as used herein are inclusive of the stated value and means within an acceptable range of deviation for the particular value as determined by one of ordinary skill in the art, considering the measurement in question and the error associated with measurement of the particular quantity (i.e., the limitations of the measurement system). For example, "substantially" can mean within one or more standard deviations, or within ±20%, ±15%, ±10%, ±5%, ±3% of the stated value. It is noted that the term "same" may also refer to "about" because of the process deviation or the process fluctuation.

It should be understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

FIG. 1 is a block diagram of a driving circuit in accordance with an embodiment of the disclosure. As shown in FIG. 1, the driving circuit 100 may be configured to drive the light emitting unit XLED, which includes a pulse width modulation (PWM) circuit 110, a current source 120, and an emission switch 130. In one embodiment, the emission switch 130 may include a power source, but not limited thereto. In some embodiments, The light emitting unit XLED may include organic light-emitting diodes (OLED), quantum dots (QD), inorganic light-emitting diodes (LED), such as mini light-emitting diodes (mini LED) or micro light-emitting diodes (micro LED), quantum dot light-emitting diodes (QLED or QDLED), phosphors, fluorescence, other display elements, or a combination thereof, and is not limited thereto.

According to an embodiment of the disclosure, the driving circuit 100 may include a plurality of transistors implemented by P-type transistors. According to another embodiment of the disclosure, the driving circuit 100 may include a plurality of transistors implemented by N-type transistors. In other words, the driving circuit 100 may include a plurality of transistors implemented by either P-type transistors or N-type transistors, but not limited thereto.

The PWM circuit 110 may store the data signal SD according to a scan signal SN and generate a PWM signal SPWM according to an enable signal EN and the data signal SD stored in the PWM circuit 110. The current source 120 may generate a current IC. In some example, the current IC may be substantially constant. The emission switch 130 may couple the current source 120 to the light emitting unit XLED according to the PWM signal SPWM so that the current IC flows through the light emitting unit XLED.

As shown in FIG. 1, whether the current source 120 sinks or sources the current IC is based on whether the driving circuit 100 is implemented by P-type transistors or N-type transistors.

Figure 2:
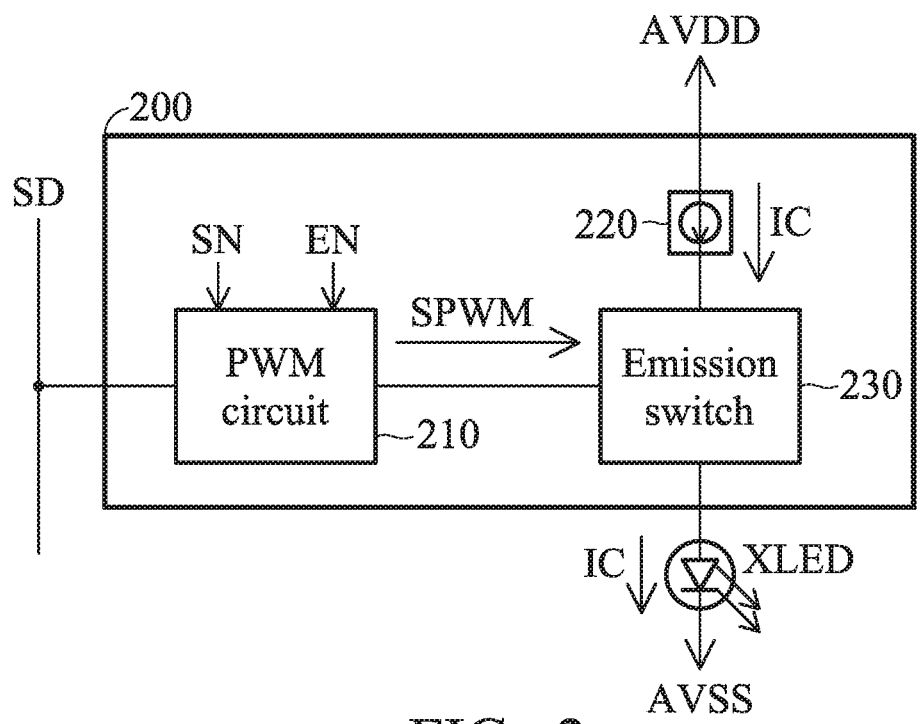
FIG. 2 is a block diagram of a driving circuit in accordance with an embodiment of the disclosure.

FIG. 2 is a block diagram of a driving circuit in accordance with an embodiment of the disclosure, in which the driving circuit in FIG. 2 includes a plurality of transistors implemented by P-type transistors. As shown in FIG. 2, the driving circuit 200 includes a PWM circuit 210, a current source 220, and an emission switch 230, in which the PWM circuit 210, the current source 220, and the emission switch 230 correspond to the PWM circuit 110, the current source 120, and the emission switch 130 in FIG. 1. The driving circuit 200 may sources a current IC flowing through the light emitting unit XLED from a supply voltage AVDD. In the present disclosure, the supply voltage AVDD and the supply voltage AVSS may be the voltage source for the light emitting unit XLED. The PWM circuit 210 may electrically connect to the supply voltage VDD and the supply voltage VSS (shown in FIG. 29). The supply voltages AVDD and AVSS may be electrically isolated from the supply voltages VDD and VSS.

Figure 3:
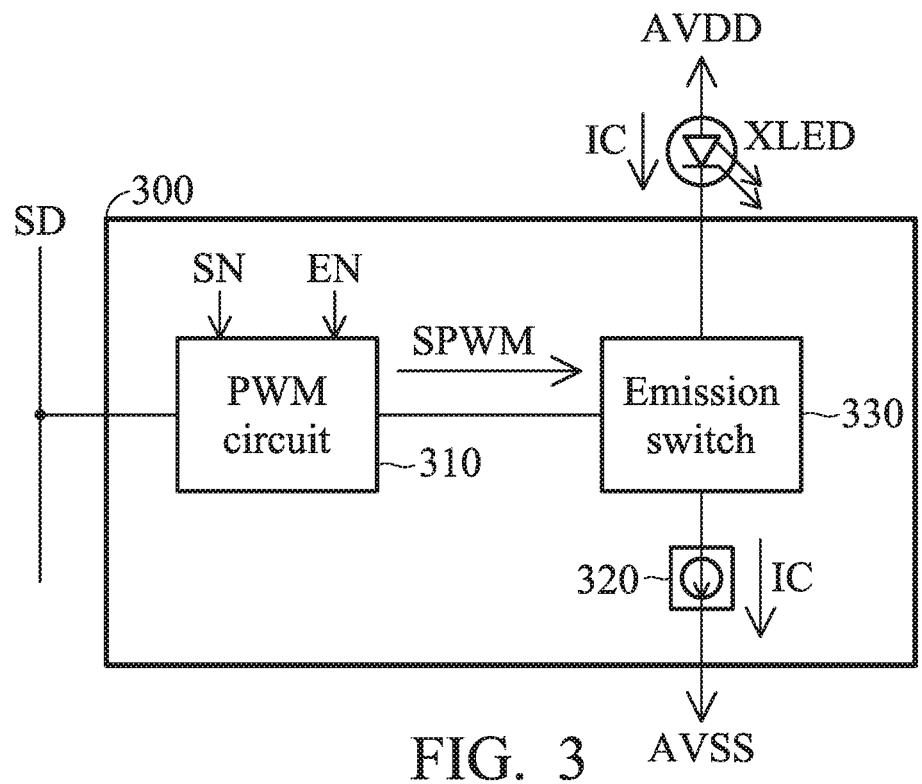
FIG. 3 is a block diagram of a driving circuit in accordance with an embodiment of the disclosure.

FIG. 3 is a block diagram of a driving circuit in accordance with another embodiment of the disclosure, in which the driving circuit 300 in FIG. 3 includes a plurality of transistors implemented by N-type transistors. As shown in FIG. 3, the driving circuit 300 includes a PWM circuit 310, a current source 320, and an emission switch 330, in which the PWM circuit 310, the current source 320, and the emission switch 330 correspond to the PWM circuit 110, the current source 120, and the emission switch 130 in FIG. 1. The driving circuit 300 sinks a current IC flowing through the light emitting unit XLED to a supply voltage AVSS.

According to an embodiment of the disclosure, the scan signal SN, the data signal SD, and the enable signal EN are N bits, in which N is a positive integer. Thus, the PWM circuit 210 in FIG. 2, or the PWM circuit 310 in FIG. 3, includes N PWM units. At least one of the PWM units may store a corresponding bit of the data signal SD according to the corresponding bit of the scan signal SN, and generate the PWM signal SPWM according to the corresponding bit of the data signal SD and the enable signal EN.

Since N-type transistors and P-type transistors may be exchanged, one skilled in the art will understand how to modify the embodiments of the driving circuit with P-type transistors provided as follows to obtain the driving circuit with N-type transistors. In the following paragraphs, only the operations of the driving circuits with P-type transistors are illustrated for the simplicity of explanation.

Figure 4:
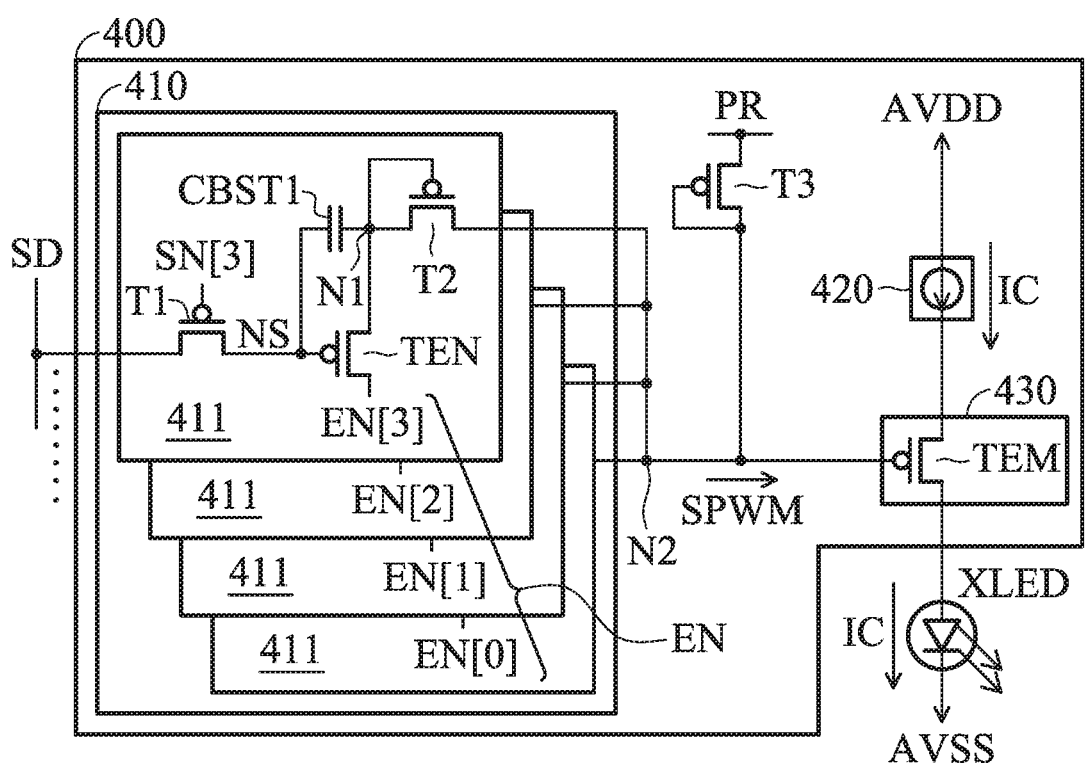
FIG. 4 is a schematic diagram of the driving circuit in accordance with an embodiment of the disclosure.

FIG. 4 is a schematic diagram of the driving circuit in accordance with an embodiment of the disclosure. According to an embodiment of the disclosure, the driving circuit 400 corresponds to the driving circuit 200 in FIG. 2.

As shown in FIG. 4, the driving circuit 400 includes a PWM circuit 410, a current source 420 and an emission switch 430. The PWM circuit 410 includes a plurality of PWM units 411. According to an embodiment of the disclosure, the scan signal SN, the data signal SD, and the enable signal EN are illustrated as 4-bit in the following paragraphs, but not intended to be limited thereto. The PWM circuit 410 includes four of the PWM units 411 for the simplicity of explanation, but not intended to be limited thereto. The number of the bit and/or the PWM units may be more or less than 4 according to the needs, such as 2, 8, 16, 32 or 64, but not limited thereto.

At least one of the PWM units 411 includes a first transistor T1, an enable transistor TEN a first bootstrap capacitor CBST1, and a second transistor T2. The first transistor T1 passes a corresponding bit of the data signal SD to the storage node NS according to a corresponding bit of the scan signal SN[n]. As illustrated in FIG. 4, the scan signal SN includes a first bit of the scan signal SN[0] (not shown), a second bit of the scan signal SN[1](not shown), a third bit of the scan signal SN[2] (not shown), and a fourth bit of the scan signal SN[3], and the control terminal of the first transistor T1 of the PWM unit 411 receives the fourth bit of the scan signal SN[3].

The enable transistor TEN includes a control terminal, a first terminal, and a second terminal, in which the control terminal may be coupled to the storage node NS, the first terminal may be coupled to a first node N1, and the second terminal may receive the corresponding bit of the enable signal EN[n].

As illustrated in FIG. 4, the enable signal EN includes a first bit of the enable signal EN[0], a second bit of the enable signal EN[1], a third bit of the enable signal EN[2], and a fourth bit of the enable signal EN[3], and the second terminal of the enable transistor TEN of the PWM unit 411 receives the fourth bit of the enable signal EN[3].

The first bootstrap capacitor CBST1 is coupled between the storage node NS and the first node N1. The second transistor T2 includes a control terminal, a first terminal, and a second terminal, in which the control terminal is coupled to the first node N1, the first terminal is coupled to the first node N1, and the second terminal is coupled to a second node N2. In other words, the second terminals of the second transistor T2 of the PWM units 411 are coupled together as the second node N2.

As shown in FIG. 4, the driving circuit 400 further includes a third transistor T3. The third transistor T3 includes a control terminal, a first terminal, and a second terminal, in which the control terminal is coupled to the second node N2, the first terminal receives a preset signal PR, and a second terminal is coupled to the second node N2.

The current source 420, which corresponds to the current source 220 in FIG. 2, generates a current IC. The emission switch 430 includes an emission transistor TEM. The emission transistor TEM includes a control terminal, a first terminal, and a second terminal, in which the control terminal receives the PWM signal SPWM, the first terminal receives the current IC, and the second terminal is coupled to the light emitting unit XLED.

Figure 5A:
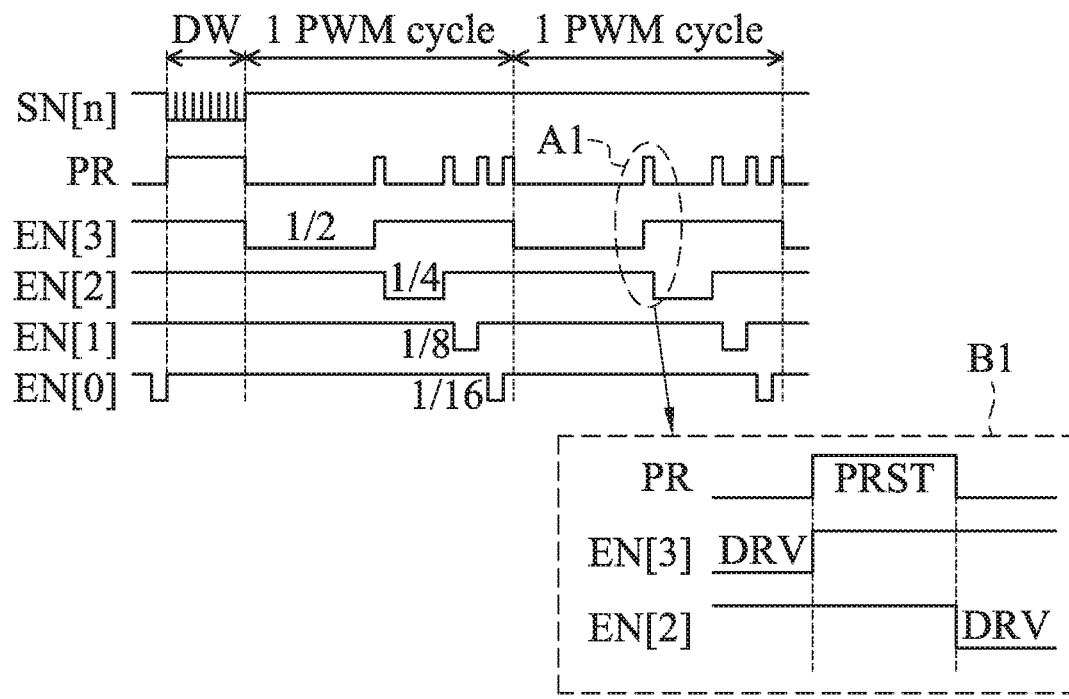
FIGS. 5A and 5B illustrate a timing diagram in FIG. 4 in accordance with an embodiment of the disclosure.
Figure 5B:
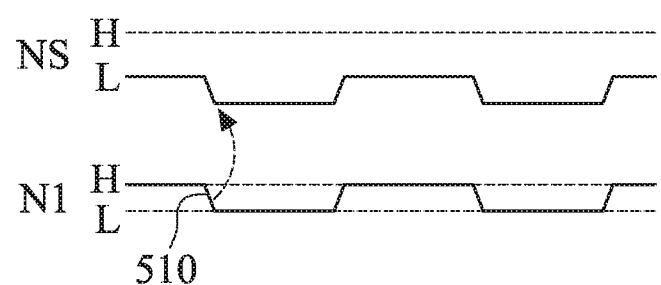

FIGS. 5A and 5B illustrate a timing diagram in FIG. 4 in accordance with an embodiment of the disclosure. As shown in FIG. 5A, during one PWM cycle, the first enable bit EN[0] may be activated in a 1/16 duty cycle (i.e., at the low voltage level), the second enable bit EN[1] may be activated in a 1/8 duty cycle, the third enable bit EN[2] may be activated in a 1/4 duty cycle and the fourth enable bit EN[3] may be activated in a 1/2 duty cycle. Please refer to FIGS. 5A and 4, at least one bit of the data signal SD is thus weighted by the corresponding bit of the enable signal EN to generate the PWM signal SPWM at the second node N2 to turn ON the emission transistor TEM.

When the driving circuit 400 is operating in a data-writing state DW, the preset signal PR and at least one bit of the enable EN are at the high voltage level, and the scan signal SN is at the low voltage level. When a corresponding bit of the scan signal SN is at the low voltage level, the corresponding PWM unit 411 receives the corresponding bit of the data signal SD and stores the corresponding bit of the data signal SD in the storage node NS.

As illustrated in FIGS. 4 and 5A, when the fourth bit of the scan signal SN[3] is at the low voltage level, the corresponding PWM unit 411 receives and stores the corresponding bit of the data signal SD. According to an embodiment of the disclosure, each of the PWM unit 411 may individually receives each bit of the data signal SD. In other words, each bit of the scan signal SN may be at the low voltage level one-by-one so that each of the PWM unit 411 may receive the corresponding bit of the data signal SD one after another.

According to another embodiment of the disclosure, the PWM circuit 410 may receive the data signal SD all at once. In other words, the data signal SD may be transmitted through a data bus and each bit of the scan signal SN is simultaneously at the low voltage level so that the PWM circuit 410 receives all bits of the data signal SD all at once.

As shown in FIGS. 4 and 5A, the area A1 has been enlarged as the area B1. When the driving circuit 400 is operating in a preset state PRST, the preset signal PR and at least one bit of the enable signal EN are at the high voltage level. Namely, the third transistor T3 is turned ON in response to the preset signal PR at the high voltage level to pull the second node N2 (i.e., the PWM signal SPWM) to the high voltage level, and the first node N1 in at least one of the PWM unit 411 is also preset to the high voltage level through the third transistor T3 or the enable transistor TEN. According to an embodiment of the disclosure, the data-writing state DW is operated during the preset state PRST.

When the driving circuit 400 is operating in a drive state DRV, the scan signal SN (i.e., at least one bit of the scan signal SN) is at the low voltage level while the preset signal PR and the corresponding bit of the enable signal EN are at the low voltage level. Therefore, the corresponding bit of the data signal SD stored in the storage node NS may be transmitted to the second node N2 to drive the emission switch 430 to illuminate the light emitting unit XLED.

As shown in FIGS. 4 and 5B, when the driving circuit 400 is operating in the drive state DRV and the corresponding bit of the data signal SD stored in the storage node NS is at the high voltage level H, the first node N1 is still at the high voltage level H. When the driving circuit 400 is operating in the drive state DRV and the corresponding bit of the data signal SD stored in the storage node NS is at the low voltage level L, the first node N1 is discharged to the low voltage level L so that a negative pulse 510 is generated at the first node N1.

However, the negative pulse 510 at the first node N1 can be coupled to the storage node NS through the first bootstrap capacitor CBST1 to pull the storage node NS lower than the low voltage level L. Since the enable transistor TEN may be a P-type transistor and the corresponding bit of the enable signal EN is at the low voltage level L, a voltage lower than the low voltage level L at the storage node NS may lead to turn ON the enable transistor TEN so that the first node N1 is able to be pulled down to as low as the low voltage level L. The second transistor T2 then passes the low voltage level L of the first node N1 to the second node N2 to turn ON the emission transistor TEM.

According to an embodiment of the disclosure, as shown in FIG. 5A, the data-writing state DW is operated outside the PWM cycle. Namely, the period for driving the light emitting unit XLED could be shortened. According to an embodiment of the disclosure, since the enable transistor TEN is configured to drive the emission switch 430, the size of the enable transistor TEN should be large to provide sufficient driving capability.

Figure 6:
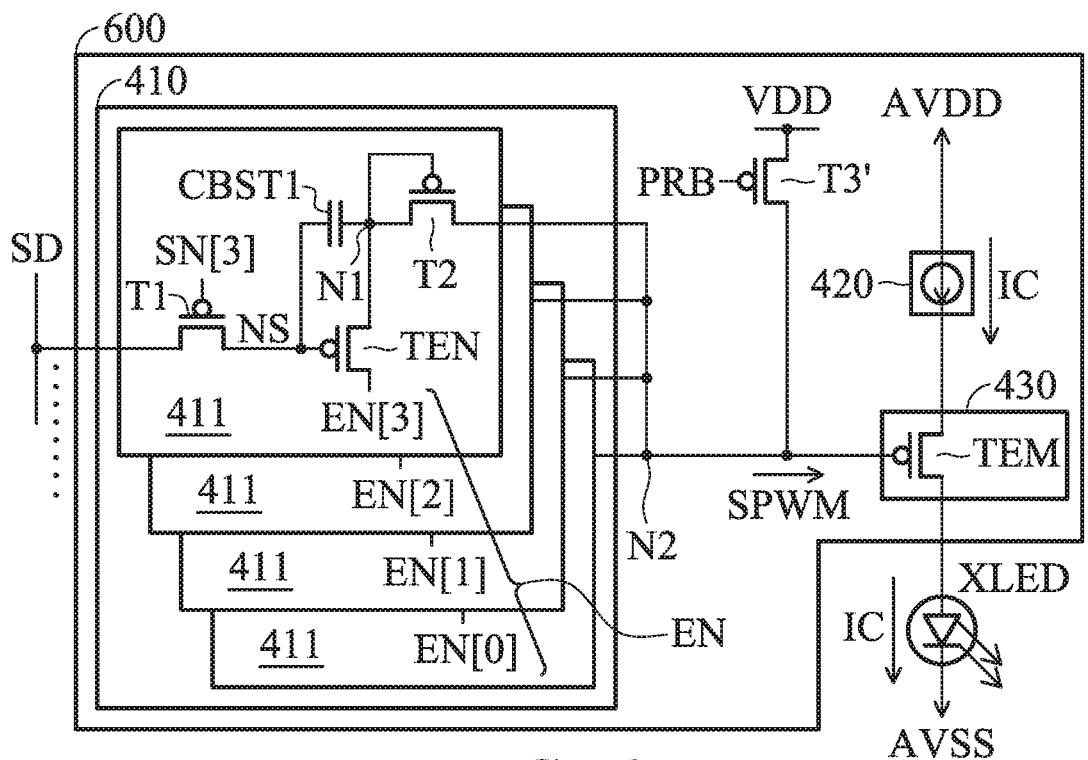
FIG. 6 is a schematic diagram of the driving circuit in accordance with another embodiment of the disclosure.

FIG. 6 is a schematic diagram of the driving circuit in accordance with another embodiment of the disclosure. One will see, if one compares the driving circuit 600 with the driving circuit 400 in FIG. 4, the third transistor T3 in FIG. 4 has been replaced with a third transistor T3' in FIG. 6.

The third transistor T3' includes a control terminal, a first terminal, and a second terminal, in which the control terminal receives a reverse preset signal PRB. The reverse preset signal PRB is an inverse of the preset signal PR in FIG. 4. The first terminal is coupled to the supply voltage VDD, and the second terminal is coupled to the second node N2. The operations of the driving circuit 600 are identical or similar to those of the driving circuit 400 in FIG. 4, which are not repeated herein.

Figure 7:
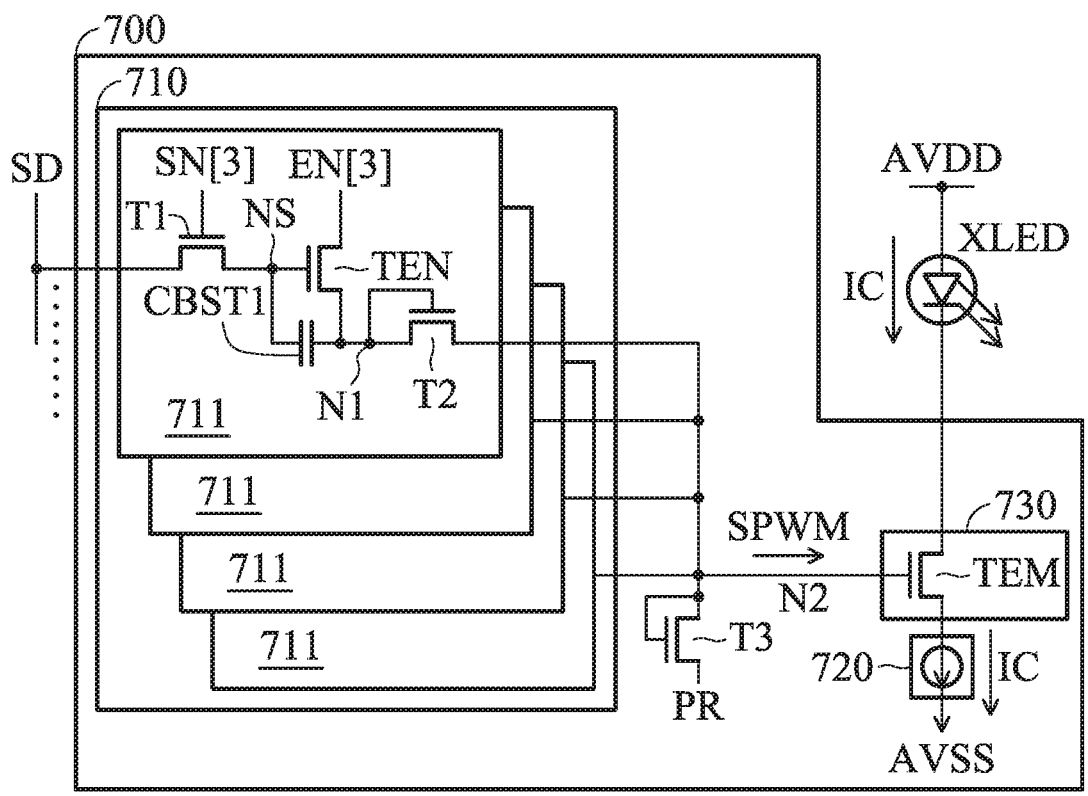
FIG. 7 is a schematic diagram of the driving circuit in accordance with another embodiment of the disclosure.

FIG. 7 is a schematic diagram of the driving circuit in accordance with an embodiment of the disclosure. According to an embodiment of the disclosure, the driving circuit 700 corresponds to the driving circuit 300 in FIG. 3. According to an embodiment of the disclosure, the driving circuit 700 is implemented by N-type transistors.

As shown in FIG. 7, the driving circuit 700 includes a PWM circuit 710, a current source 720, and an emission switch 730. One will see, if one compares the driving circuit 700 with the driving circuit 400 in FIG. 4, all the P-type transistors in FIG. 4 are replaced with N-type transistors with some proper modifications. The operations of the driving circuit 600 are identical or similar to those of the driving circuit 400 in FIG. 4, which are not repeated herein.

According to an embodiment of the disclosure, the third transistor T3 in FIG. 7 may be replaced with a third transistor T3' of an N-type transistor as the third transistor T3 in FIG. 4 replaced with the third transistor T3' in FIG. 6, which is not repeated herein.

Figure 8:
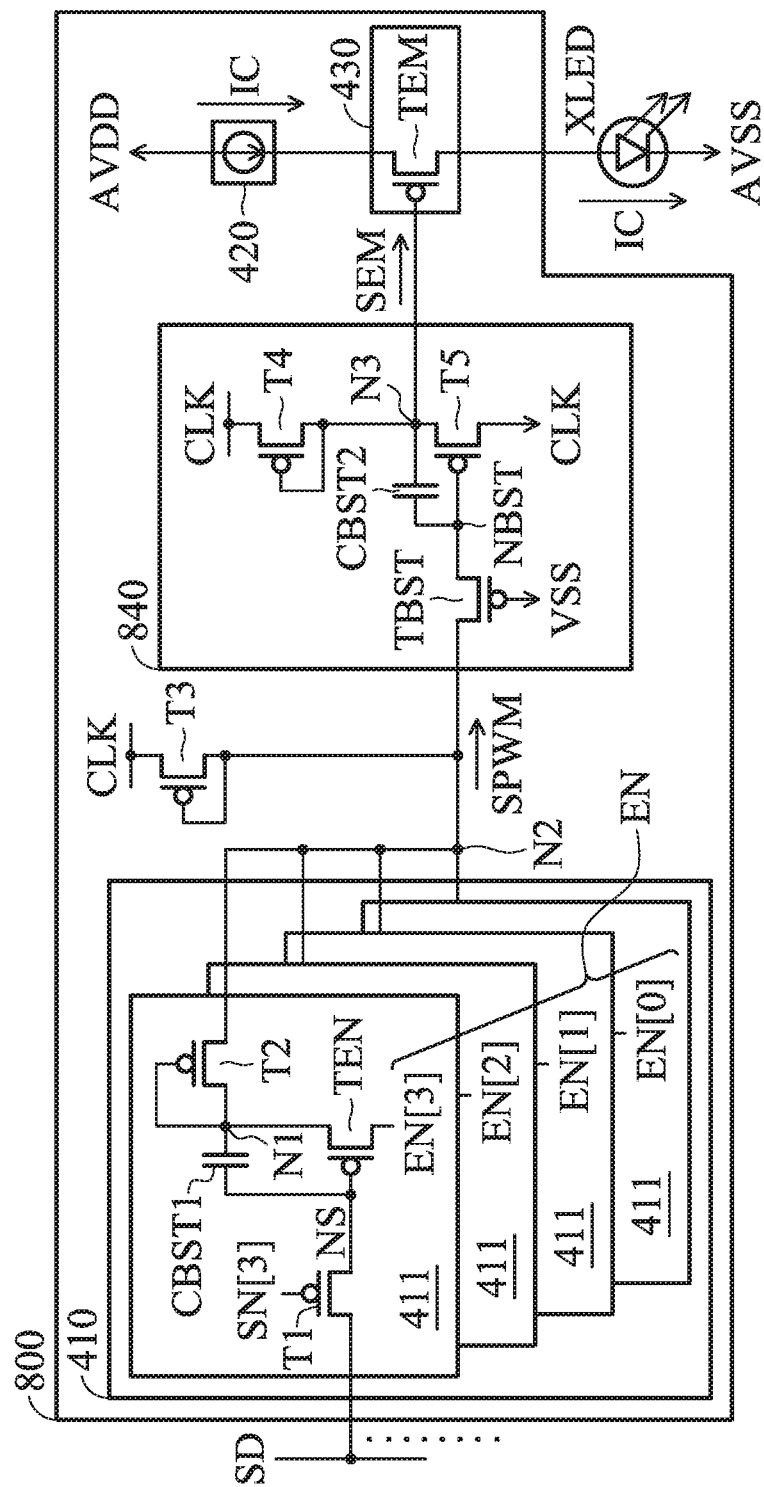
FIG. 8 is a schematic diagram of the driving circuit in accordance with another embodiment of the disclosure.

FIG. 8 is a schematic diagram of the driving circuit in accordance with another embodiment of the disclosure. According to an embodiment of the disclosure, the driving circuit 800 corresponds to the driving circuit 200 in FIG. 2. According to an embodiment of the disclosure, the driving circuit 800 is implemented by P-type transistors.

One will see, if one compares the driving circuit 800 with the driving circuit 400 in FIG. 4, the driving circuit 800 further includes a buffer circuit 840 coupled between the PWM circuit 410 and the emission switch 430, and the third transistor T3 receives a clock signal CLK instead of the preset signal PR as shown in FIG. 4.

The buffer circuit 840 includes a fourth transistor T4, a fifth transistor T5, a bootstrap transistor TBST, and a second bootstrap capacitor CBST2. The fourth transistor T4 includes a control terminal, a first terminal, and a second terminal. The control terminal is coupled to a third node N3, the first terminal receives the clock signal CLK, and the second terminal is coupled to the third node N3.

The fifth transistor T5 includes a control terminal, a first terminal, and a second terminal, wherein the control terminal is coupled to a bootstrap node NBST, the first terminal is coupled to the third node N3, and the second terminal is coupled to the clock signal CLK.

The bootstrap transistor TBST includes a control terminal, a first terminal, and a second terminal, wherein the control terminal is coupled to the ground level VSS, the first terminal is coupled to the second node N2, and the second terminal is coupled to the bootstrap node NBST. The second bootstrap capacitor CBST2 is coupled between the bootstrap node NBST and the third node N3.

Figure 9A:
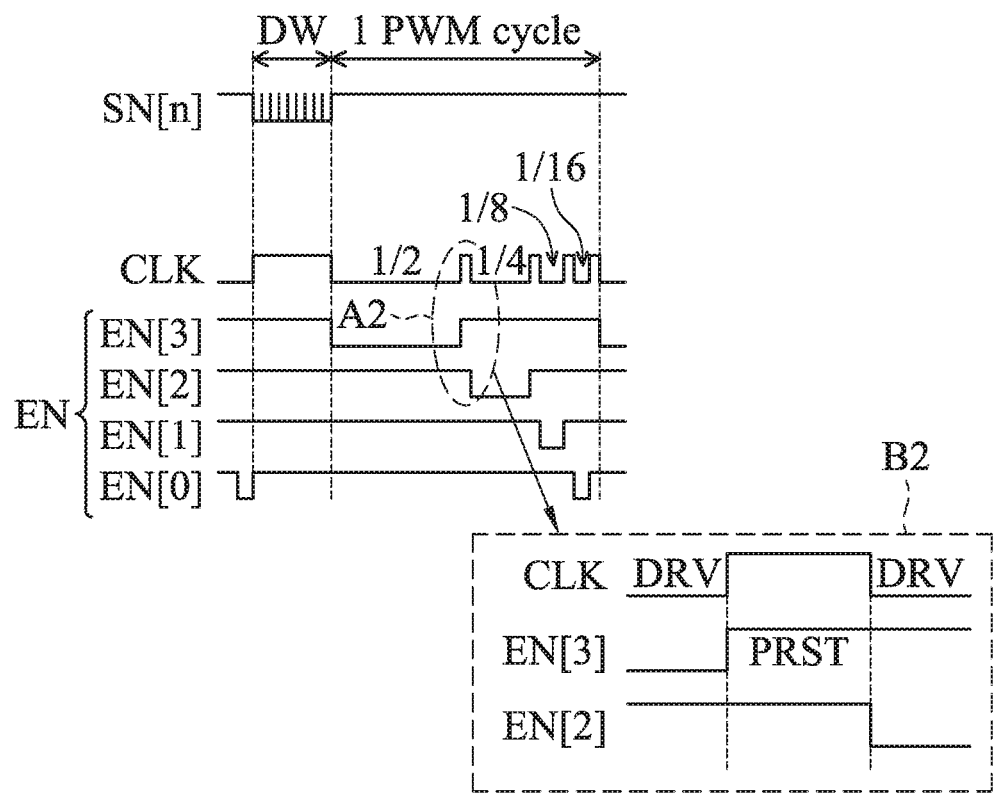
FIGS. 9A and 9B illustrate a timing diagram of the driving circuit in FIG. 8 in accordance with an embodiment of the disclosure.
Figure 9B:
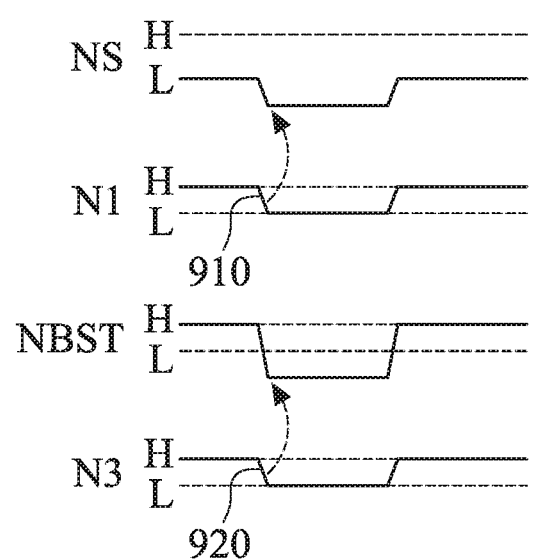

FIGS. 9A and 9B illustrate a timing diagram of the driving circuit in FIG. 8 in accordance with an embodiment of the disclosure. As shown in FIGS. 8 and 9, the area A2 has been enlarged to be the area B2. According to an embodiment of the disclosure, when the driving circuit 800 is operating in a preset state PRST, the clock signal CLK and at least one bit of the enable signal EN are at the high voltage level (i.e., the supply voltage VDD). Therefore, the third transistor T3 presets the first node N1, the second node N2 and the bootstrap node NBST to the high voltage level, and the fourth transistor T4 pulls the emission signal SEM at the third node N3 to the high voltage level.

When the driving circuit 800 is operating in a data-writing state DW, the scan signal SN is at the low voltage level (i.e., the ground level VSS), while the clock signal CLK and at least one bit of the enable signal EN are at the high voltage level. Therefore, the first transistor T1 of the corresponding PWM unit 411 receives and stores the corresponding bit of the data signal SD according to the corresponding bit of the scan signal SN.

According to some embodiments of the disclosure, the PWM circuit 410 may receive each bit of the data signal SD all at once, or may receive each bit of the data signal SD one after another. According to an embodiment of the disclosure, the data-writing state DW is operated during the preset state PRST.

When the driving circuit 800 is operating in a drive state DRV, the scan signal SN is at the high voltage level, while the clock signal CLK and the corresponding bit of enable signal EN are at the low voltage level so that the corresponding bit of the data signal SD stored in the storage node NS can be transmitted to the third node N3 to drive the emission transistor TEM.

As shown in FIGS. 8 and 9B, when the driving circuit 800 is operating in the drive state DRV and the voltage of the storage node NS is at the high voltage level H, the first node N1, the bootstrap node NBST, and the third node N3 are at the high voltage level H to turn OFF the emission transistor TEM.

When the driving circuit 800 is operating in the drive state DRV and the voltage of the storage node NS is at the low voltage level L, the first node N1 is discharged through the enable transistor TEN to induce a first negative pulse 910 at the first node N1. The first negative pulse 910 is then coupled to the storage node NS through the first bootstrap capacitor CBST1 so that the voltage of the storage node NS is lower than the low voltage level L to turn ON the enable transistor TEN for pulling the first node N1 down as low as the low voltage level L.

Meanwhile, the second node N2 and the bootstrap node NBST are discharged through the enable transistor TEN, the second transistor T2, and the bootstrap transistor TBST. Since the bootstrap node NBST is pulled low, the third node N3 is discharged through the fifth transistor T5 to generate a second negative pulse 920 at the third node N3. The second negative pulse 920 is then coupled to the bootstrap node NBST so that the bootstrap node NBST is at a voltage level lower than the low voltage level L.

Since the voltage of the bootstrap node NBST is lower than the low voltage level L and the clock signal CLK is at the low voltage level when the driving circuit 800 is operating in the drive state DRV, the fifth transistor T5 can be fully turned ON to pull the third node N3 down to the low voltage level L to turn ON the emission transistor TEM to illuminate the light emitting unit XLED.

According to an embodiment of the disclosure, as shown in FIG. 9A, the data-writing state DW is operated outside the PWM cycle. Namely, the period for driving the light emitting unit XLED could be shortened. According to an embodiment of the disclosure, since the driving circuit 800 includes the buffer circuit 840, the size of the enable transistor TEN for driving the emission transistor TEM can be mitigated.

Figure 10:
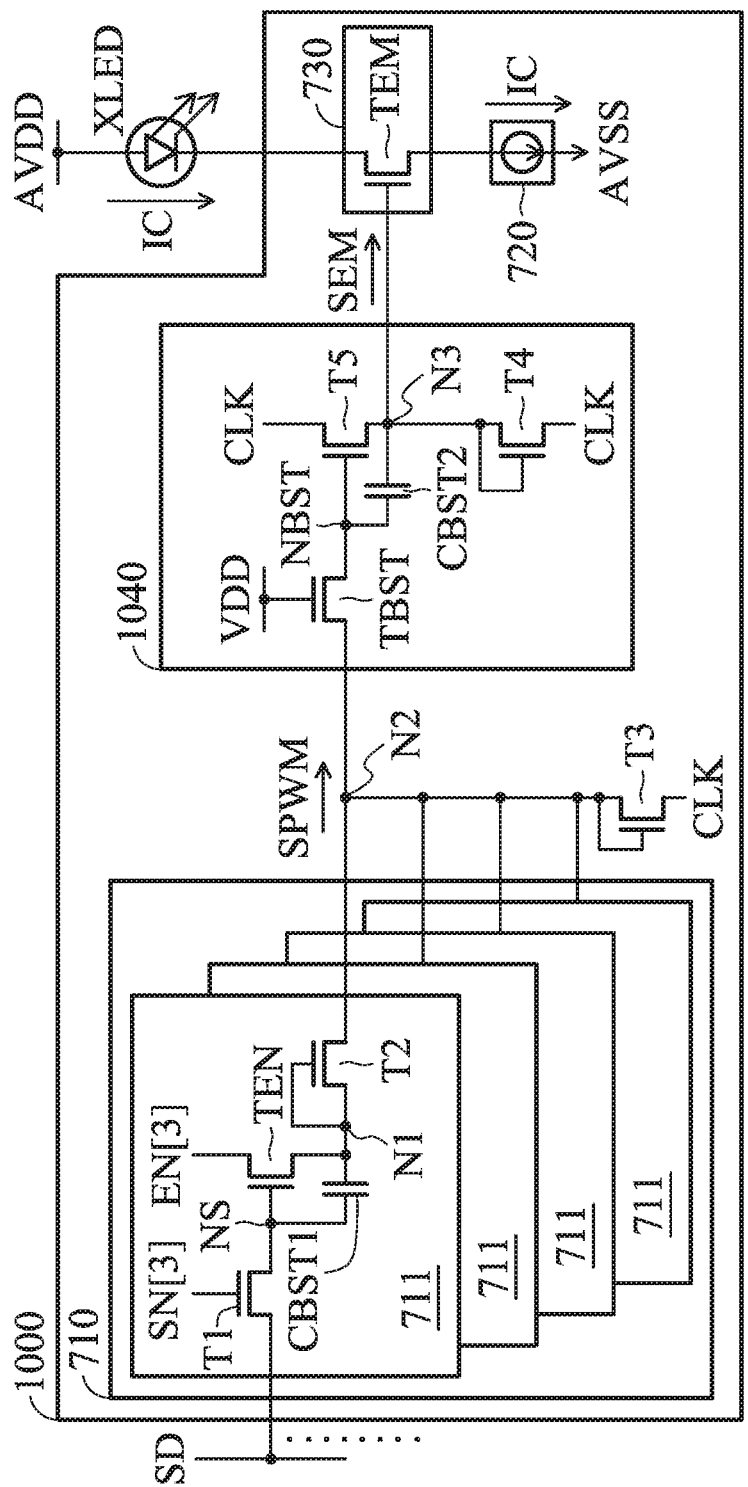
FIG. 10 is a schematic diagram of the driving circuit in accordance with another embodiment of the disclosure.

FIG. 10 is a schematic diagram of the driving circuit in accordance with another embodiment of the disclosure. According to an embodiment of the disclosure, the driving circuit 1000 corresponds to the driving circuit 300 in FIG. 3. According to an embodiment of the disclosure, the driving circuit 1000 is implemented by N-type transistors.

As shown in FIG. 10, the driving circuit 1000 includes a PWM circuit 710, a current source 720, an emission switch 730, and a buffer circuit 1040. One will see, if one compares the driving circuit 1000 with the driving circuit 800 in FIG. 8, all the P-type transistors in FIG. 8 are replaced with N-type transistors with some proper modifications. The operations of the driving circuit 1000 are identical or similar to those of the driving circuit 800 in FIG. 8, which are not repeated herein.

Figure 11:
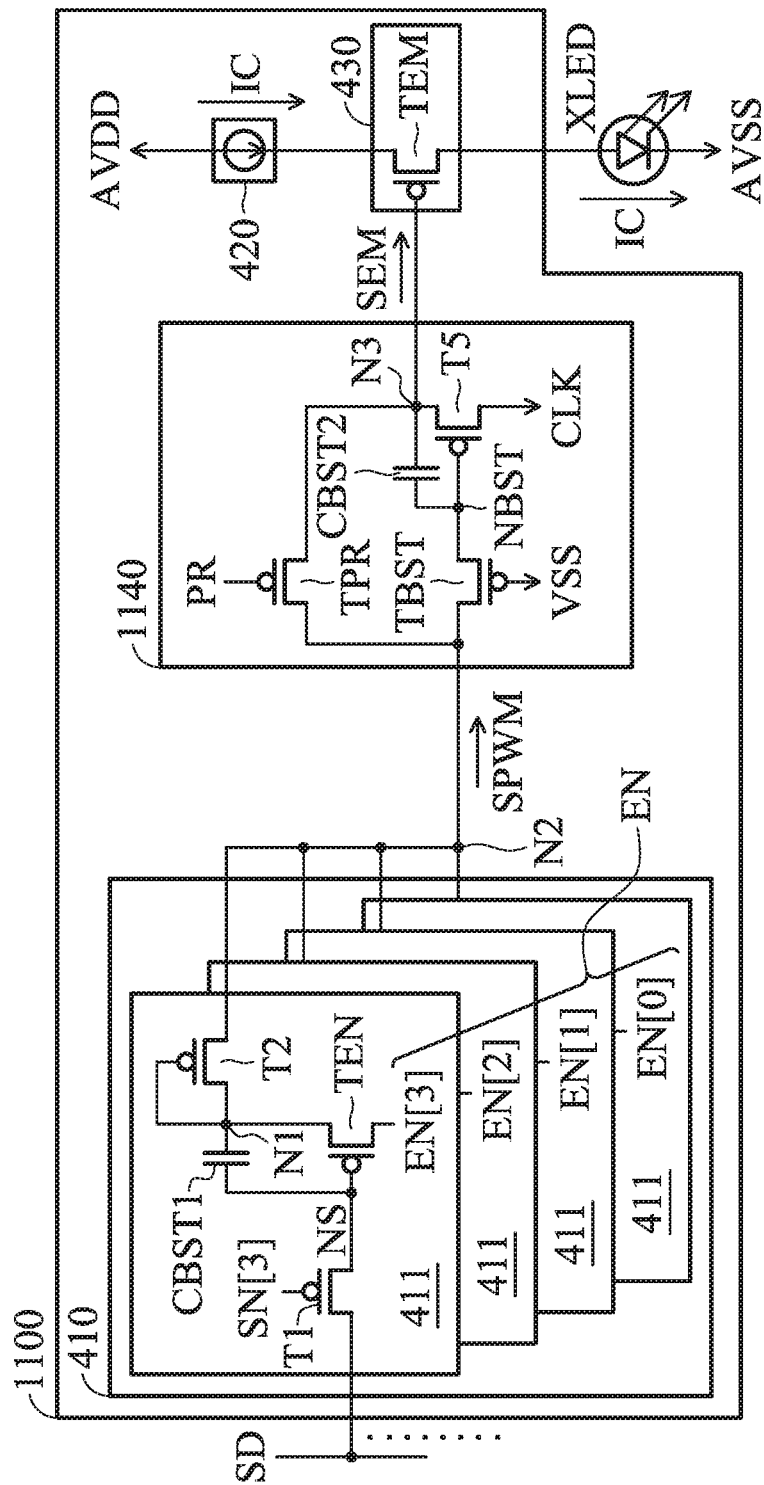
FIG. 11 is a schematic diagram of the driving circuit in accordance with another embodiment of the disclosure.

FIG. 11 is a schematic diagram of the driving circuit in accordance with another embodiment of the disclosure.

According to an embodiment of the disclosure, the driving circuit 1100 corresponds to the driving circuit 200 in FIG. 2. According to an embodiment of the disclosure, the driving circuit 1100 is implemented by P-type transistors.

As shown in FIG. 11, the driving circuit 1100 includes a PWM circuit 410, a current source 420, an emission switch 430, and a buffer circuit 1140. The PWM circuit 410, the current source 420 and the emission switch 430 in FIG. 11 are identical or similar to those in FIG. 4, which are not repeated herein.

The buffer circuit 1140 includes a bootstrap transistor TBST, a preset transistor TPR, a second bootstrap capacitor CBST2, and a fifth transistor T5. The bootstrap transistor TBST includes a control terminal, a first terminal, and a second terminal, wherein the control terminal is coupled to the ground level VSS, the first terminal is coupled to the second node N2, and the second terminal is coupled to a bootstrap node NBST.

The second bootstrap capacitor CBST2 is coupled between the bootstrap node NBST and the third node N3. The fifth transistor T5 includes a control terminal, a first terminal, and a second terminal, wherein the control terminal is coupled to the bootstrap node NBST, the first terminal is coupled to the third node N3, and the second terminal receives a clock signal CLK.

Figure 12:
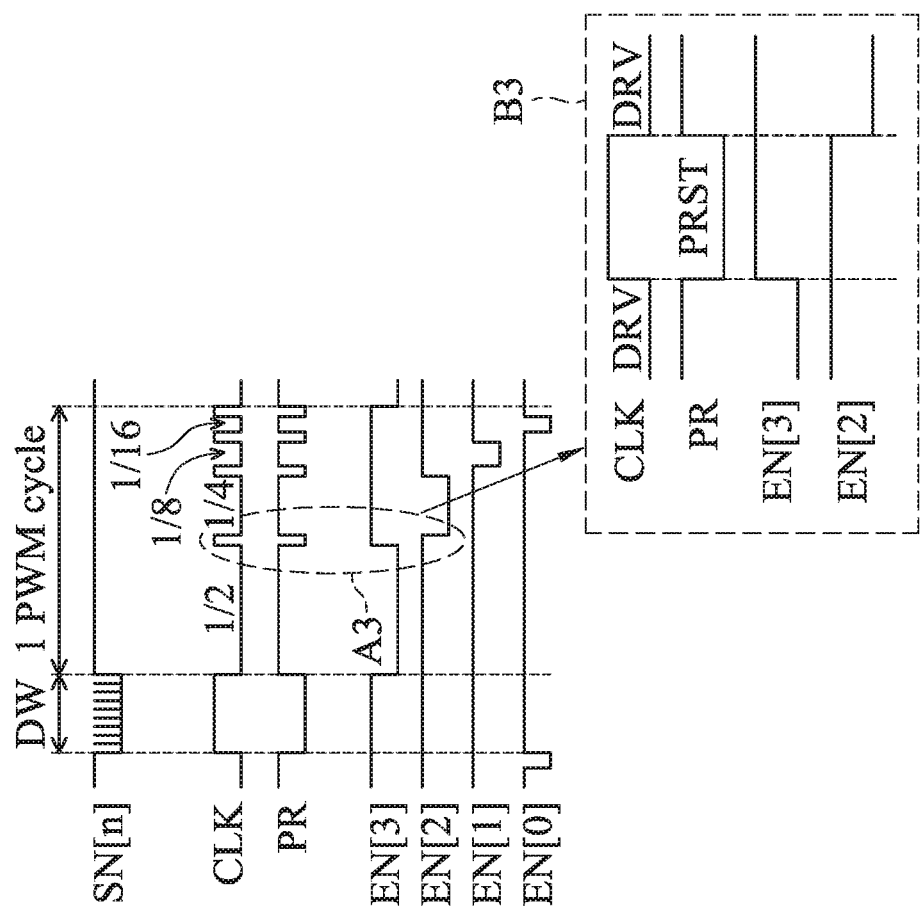
FIG. 12 illustrates a timing diagram of the driving circuit in FIG. 11 in accordance with another embodiment of the disclosure.

FIG. 12 illustrates a timing diagram of the driving circuit in FIG. 11 in accordance with another embodiment of the disclosure. As shown in FIG. 12, the area A3 has been enlarged to be the area B3.

According to an embodiment of the disclosure, when the driving circuit 1100 is operating in a preset state PRST, the clock signal CLK and at least one bit of the enable signal EN are at the high voltage level while the preset signal PR is at the low voltage level. Therefore, the clock signal CLK at the high voltage level presets the first node N1, the second node N2, the bootstrap node NBST, and the emission node SEM to the high voltage level through the fifth transistor T5 and the preset transistor TPR.

According to another embodiment of the disclosure, when the driving circuit 1100 is operating in a data-writing state DW, the clock signal CLK and at least one bit of the enable signal EN are at the high voltage level while a corresponding bit of the scan signal SN and the preset signal PR are at the low voltage level. A corresponding PWM unit 411 receives and stores the corresponding bit of the data signal SD according to the corresponding bit of the scan signal SN at the low voltage level.

According to some embodiments of the disclosure, the PWM circuit 410 may receive each bit of the data signal SD all at once, or may receive each bit of the data signal SD one after another. According to an embodiment of the disclosure, the data-writing state DW is operated during the preset state PRST. According to an embodiment of the disclosure, as shown in FIG. 12, the data-writing state DW is operated outside the PWM cycle. Namely, the period for driving the light emitting unit XLED could be shortened.

According to yet another embodiment of the disclosure, when the driving circuit 1100 is operating in a drive state DRV, the clock signal CLK and the corresponding bit of the enable signal EN are at the low voltage level while the preset signal PR and the scan signal SN are at the high voltage level. The corresponding bit of the data signal SD stored in the storage node NS can be transmitted to the third node N3 to drive the emission transistor TEM.

When the corresponding bit of the data signal SD stored in the storage node NS is at the high voltage level, the first node N1, the second node N2, and the bootstrap node NBST are also at the high voltage level so that the emission signal SEM is at the high voltage level to turn OFF the emission transistor TEM.

When the corresponding bit of the data signal SD stored in the storage node NS is at the low voltage level, the enable transistor TEN and the first bootstrap capacitor CBST1 pull the first node N1, the second node, and the bootstrap node NBST down to the low voltage level. The fifth transistor T5 and the second bootstrap capacitor CBST2 also pull the emission signal SEM down to the low voltage level to turn ON the emission transistor TEM.

Figure 13:
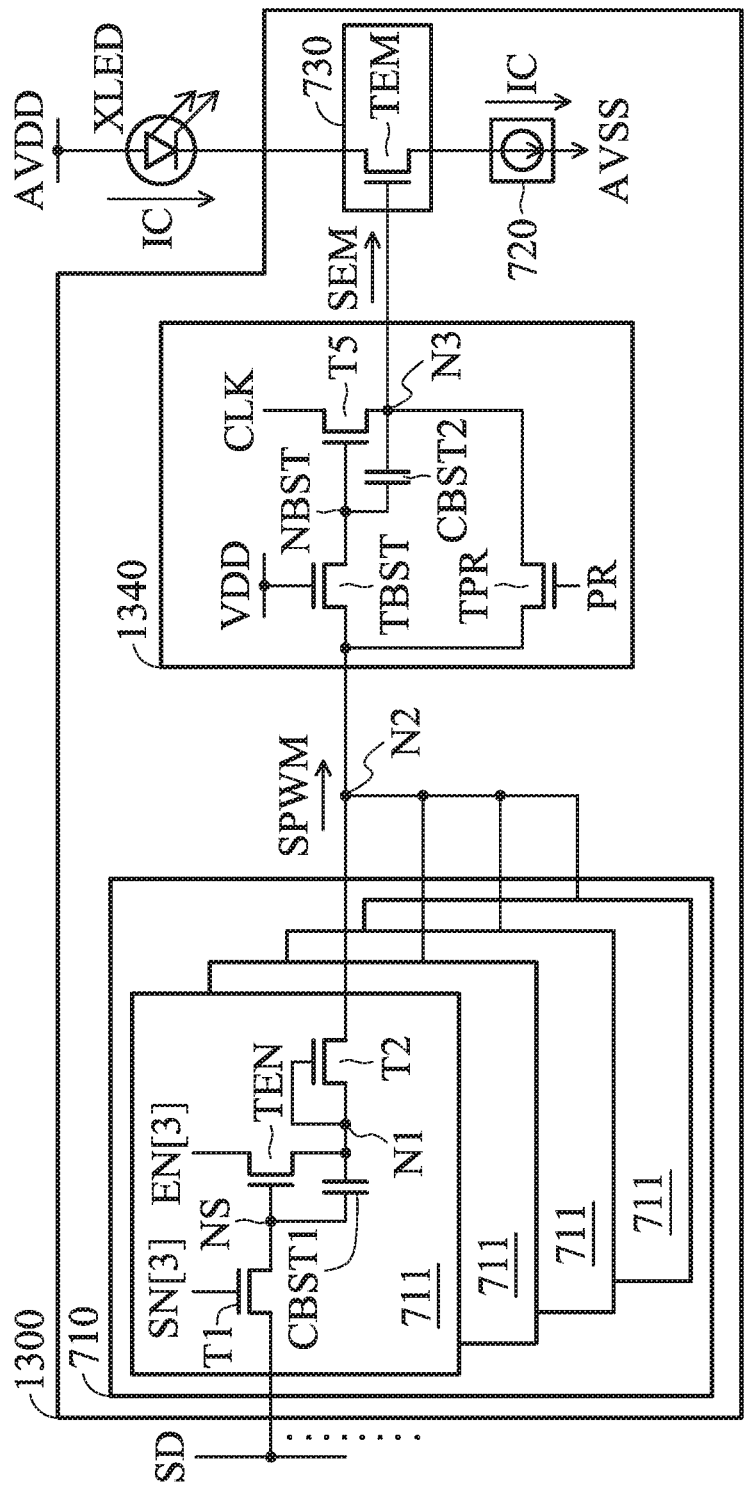
FIG. 13 is a schematic diagram of the driving circuit in accordance with another embodiment of the disclosure.

FIG. 13 is a schematic diagram of the driving circuit in accordance with another embodiment of the disclosure. According to an embodiment of the disclosure, the driving circuit 1300 corresponds to the driving circuit 300 in FIG. 3. According to an embodiment of the disclosure, the driving circuit 1300 is implemented by N-type transistors.

As shown in FIG. 13, the driving circuit 1300 includes a PWM circuit 710, a current source 720, an emission switch 730, and a buffer circuit 1340. The driving circuit 1300 is like the driving circuit 1100 in FIG. 11, except that all the P-type transistors in FIG. 11 are replaced with N-type transistors with some proper modifications. The operations of the driving circuit 1300 are identical or similar to those of the driving circuit 1100 in FIG. 11, and the descriptions thereof are not repeated herein.

Figure 14:
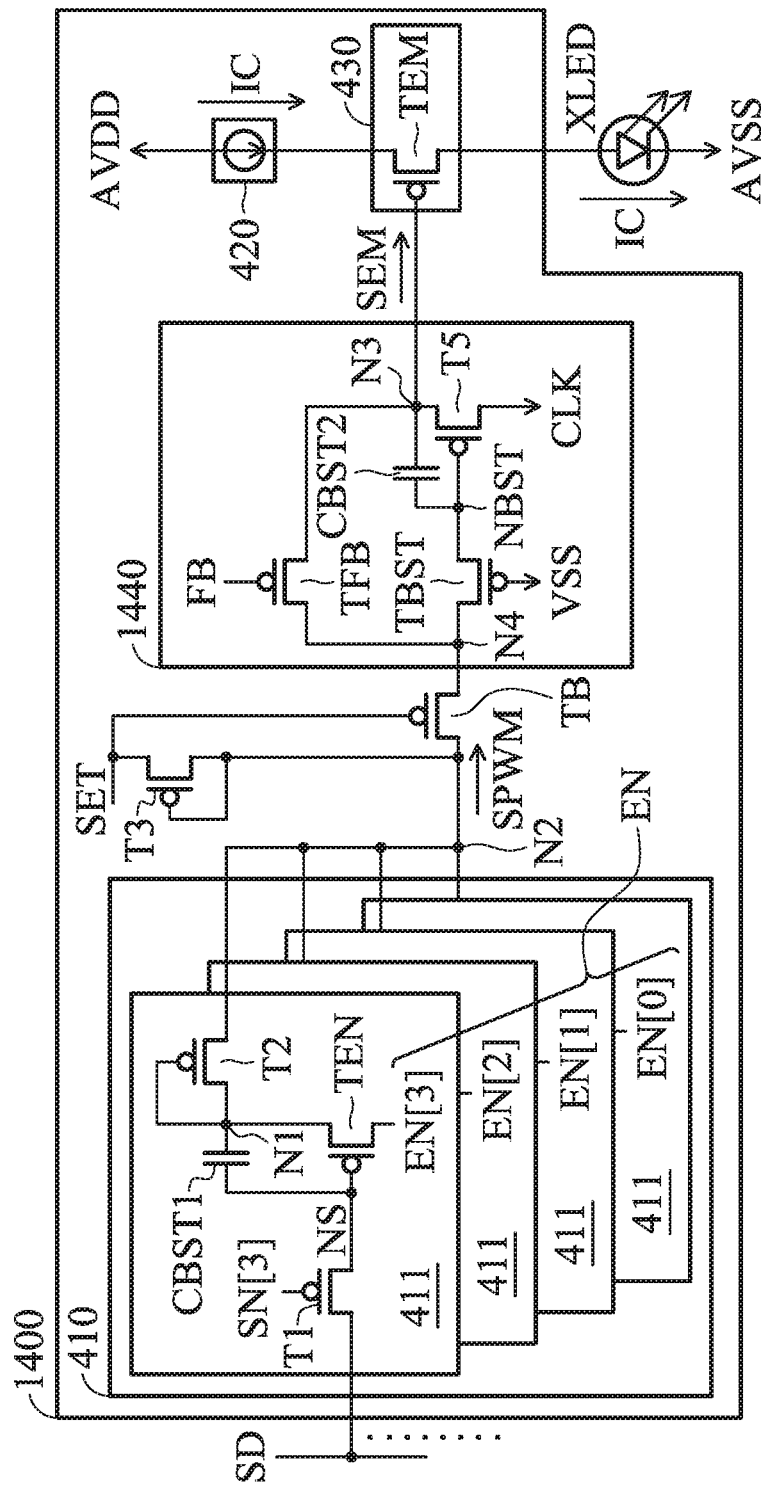
FIG. 14 is a schematic diagram of a driving circuit in accordance with another embodiment of the disclosure.

FIG. 14 is a schematic diagram of a driving circuit in accordance with another embodiment of the disclosure. According to an embodiment of the disclosure, the driving circuit 1400 corresponds to the driving circuit 200 in FIG. 2. According to an embodiment of the disclosure, the driving circuit 1400 is implemented by P-type transistors.

As shown in FIG. 14, the driving circuit 1400 includes a PWM circuit 410, a current source 420, an emission switch 430, and a buffer circuit 1440. The PWM circuit 410, the current source 420 and the emission switch 430 in FIG. 14 are identical or similar to those in FIG. 4, which are not repeated herein.

The buffer circuit 1440 includes a bootstrap transistor TBST, a feedback transistor TFB a second bootstrap capacitor CBST2, and a fifth transistor T5. The bootstrap transistor TBST includes a control terminal, a first terminal, and a second terminal, wherein the control terminal is coupled to the ground level VSS, the first terminal is coupled to a fourth node N4, and the second terminal is coupled to a bootstrap node NBST.

The feedback transistor TFB includes a control terminal, a first terminal, and a second terminal, wherein the control terminal receives a feedback signal FB, the first terminal is coupled to the fourth node N4, and the second terminal is coupled to the third node N3.

The fifth transistor T5 includes a control terminal, a first terminal, and a second terminal, wherein the control terminal is coupled to the bootstrap node NBST, the first terminal is coupled to the third node N3, and the second terminal receives the clock signal CLK. The second bootstrap capacitor CBST2 is coupled between the bootstrap node NBST and the third node N3.

As shown in FIG. 14, the driving circuit 1400 further includes a third transistor T3 and a block transistor TB. The third transistor T3 includes a control terminal, a first terminal, and a second terminal, wherein the control terminal is coupled to the second node N2, the first terminal receives a set signal SET, and a second terminal is coupled to the second node N2.

The block transistor TB includes a control terminal, a first terminal, and a second terminal, wherein the control terminal receives the set signal SET, the first terminal is coupled to the second node N2, and a second terminal is coupled to the fourth node N4.

Figure 15:
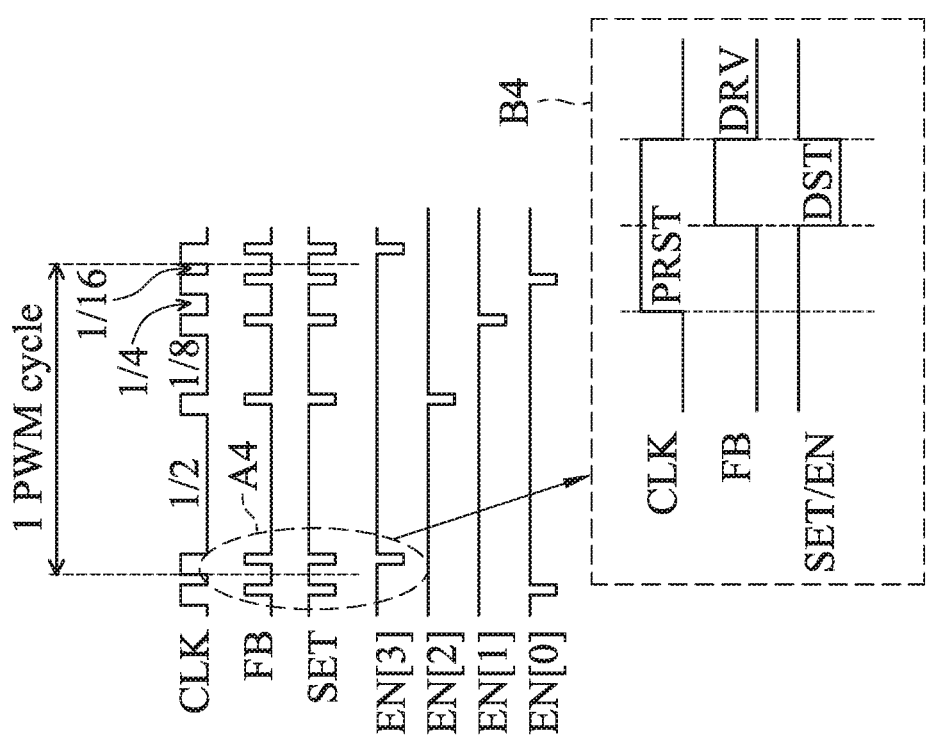
FIG. 15 illustrates a timing diagram of the driving circuit in FIG. 14 in accordance with an embodiment of the disclosure.

FIG. 15 illustrates a timing diagram of the driving circuit in FIG. 14 in accordance with an embodiment of the disclosure. As shown in FIG. 15, the area A4 has been enlarged to be the area B4.

According to an embodiment of the disclosure, when the driving circuit 1400 is operating in a preset state PRST, the clock signal CLK, the set signal SET, and at least one bit of the enable signal EN are at the high voltage level while the feedback signal FB is at the low voltage level. The clock signal CLK at the high voltage level presets the bootstrap node NBST and the emission node SEM to the high voltage level through the fifth transistor T5 and the feedback transistor TFB. The set signal SET presets the first node N1 and the second node N2 to the high voltage level through the third transistor T3. Since the set signal SET is at the high voltage level, the block transistor TB is turned OFF so that the second node N2 is isolated from the fourth node N4.

According to another embodiment of the disclosure, when the driving circuit 1400 is operating in a data-setting state DST, the clock signal CLK and the feedback signal FB are at the high voltage level while a corresponding bit of the enable signal EN and the set signal SET are at the low voltage level.

When the corresponding bit of the data signal SD stored in the storage node NS is at the low voltage level during the data-setting state DST, the corresponding bit of the data signal SD stored in the storage node NS is transmitted to the bootstrap node NBST through the second transistor T2, the block transistor TB, and the bootstrap transistor NBST. Otherwise, the first node N1, the second node N2, and the bootstrap node NBST are still at the high voltage level.

According to yet another embodiment of the disclosure, when the driving circuit 1400 is operating in a drive state DRV, the clock signal CLK and the feedback signal FB are at the low voltage level while the set signal SET and at least one bit of the enable signal EN are at the high voltage level. The fifth transistor T5 drives the emission transistor TEM according to the voltage level of the bootstrap node NBST, and the feedback transistor TFB provides a feedback path to hold the voltage level of the bootstrap node NBST and the third node N3.

When the bootstrap node NBST is at the high voltage level during the drive state DRV, the fifth transistor T5 is turned OFF while the feedback transistor TFB is turned ON to pass the high voltage level of the bootstrap node NBST to the third node N3 to turn OFF the emission transistor TEM.

When the bootstrap node NBST is at the low voltage level during the drive state DRV, the fifth transistor T5 is turned ON to pull the emission signal SEM of the third node N3 to the low voltage level. When the third node N3 is discharged through the fifth transistor T5, a negative pulse is generated at the third node N3. Meanwhile, the negative pulse of the third node N3 is coupled to the bootstrap node NBST through the second bootstrap capacitor CBST2 to turn ON the fifth transistor T5 and to pull the emission signal SEM of the third node N3 as low as the low voltage level.

According to yet another embodiment of the disclosure, when the driving circuit 1400 is operating in a data-writing state DW, the set signal SET and the enable signal EN is at the high voltage level while a corresponding bit of the scan signal SN is at the low voltage level. A corresponding PWM unit 411 receives and stores the corresponding bit of the data signal SD in response to the corresponding bit of the scan signal SN at the low voltage level.

According to an embodiment of the disclosure, the data-writing state DW may be operated during the preset state PRST. According to another embodiment of the disclosure, the data-writing state DW may be operated during the drive state DRV. In other words, since the set signal SET is at the high voltage level during the preset state PRST and the drive state DRV to isolate the PWM circuit 410 from the buffer circuit 1440, the data-writing state DW for receiving another data signal SD can be operated during the preset state PRST or the drive state DRV. Namely, the data-writing state DW may be operated during the PWM cycle so that the period for illuminating the light emitting unit XLED may not be shortened.

However, the set signal SET and a corresponding bit of the enable signal EN are at the low voltage level during the data-setting state DST so that it is not suitable for the PWM circuit 410 to receive another data signal SD.

Figure 16:
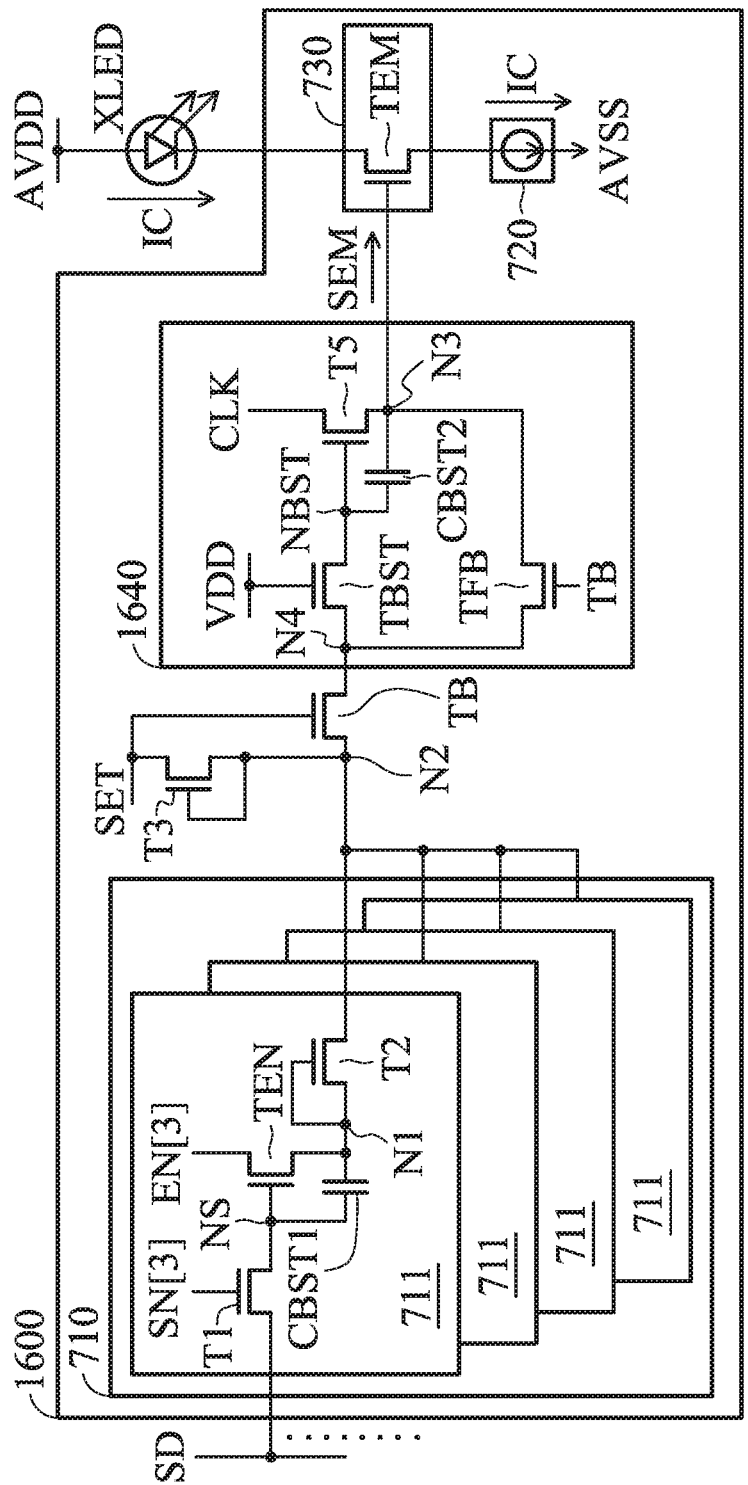
FIG. 16 is a schematic diagram of a driving circuit in accordance with another embodiment of the disclosure.

FIG. 16 is a schematic diagram of the driving circuit in accordance with another embodiment of the disclosure. According to an embodiment of the disclosure, the driving circuit 1600 corresponds to the driving circuit 300 in FIG. 3. According to an embodiment of the disclosure, the driving circuit 1600 is implemented by N-type transistors.

As shown in FIG. 16, the driving circuit 1600 includes a PWM circuit 710, a current source 720, an emission switch 730, and a buffer circuit 1640. The driving circuit 1600 is similar to the driving circuit 1400 in FIG. 14, except that all the P-type transistors in FIG. 14 are replaced with N-type transistors with some proper modifications. The operations of the driving circuit 1600 are identical or similar to those of the driving circuit 1400 in FIG. 14, and the descriptions thereof are not repeated herein.

Figure 17:
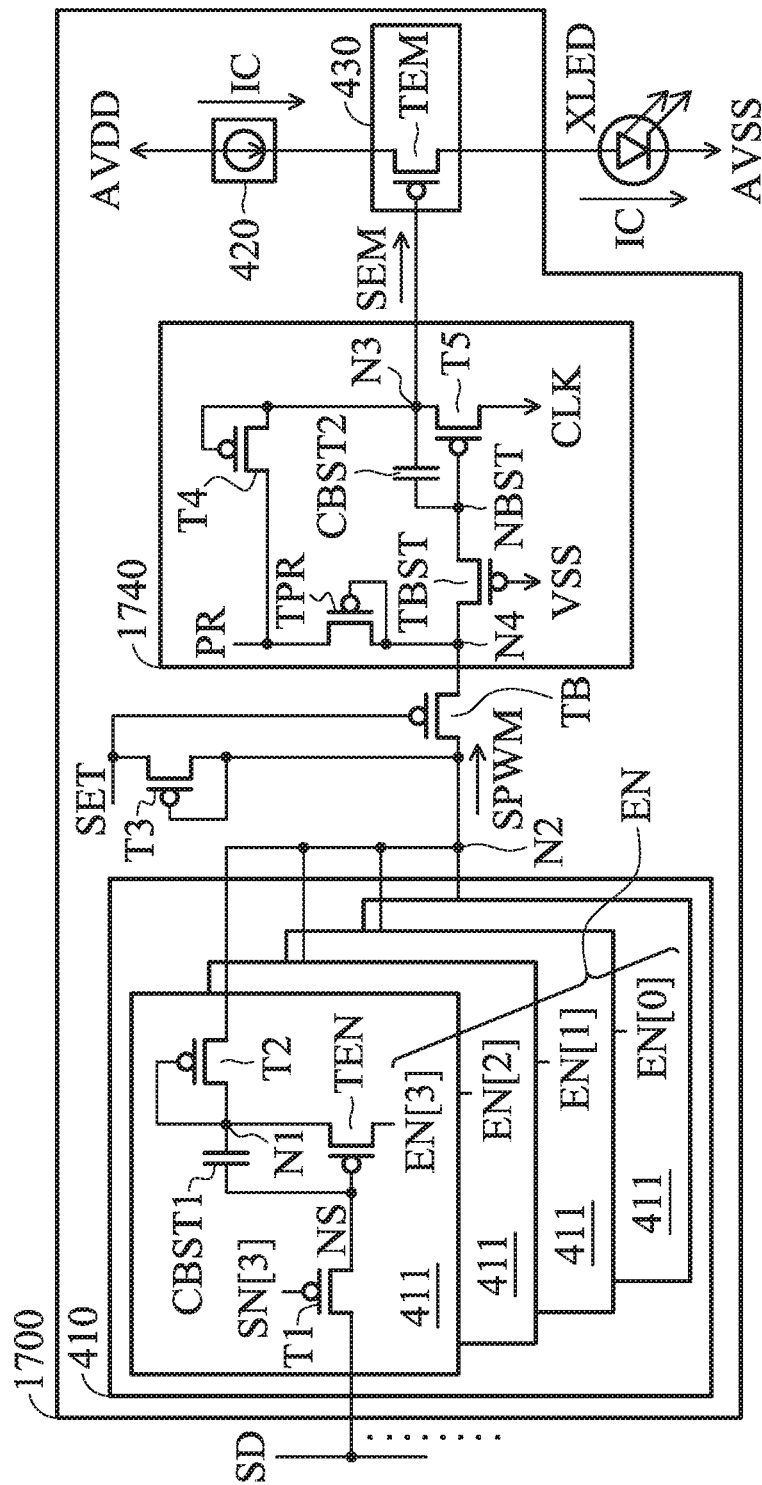
FIG. 17 is a schematic diagram of a driving circuit in accordance with another embodiment of the disclosure.

FIG. 17 is a schematic diagram of a driving circuit in accordance with another embodiment of the disclosure. According to an embodiment of the disclosure, the LED driving circuit 1700 corresponds to the driving circuit 200 in FIG. 2. According to an embodiment of the disclosure, the driving circuit 1700 is implemented by P-type transistors.

As shown in FIG. 17, the driving circuit 1700 includes a PWM circuit 410, a current source 420, an emission switch 430, a buffer circuit 1740, a third transistor T3, and a block transistor TB. The PWM circuit 410, the current source 420 and the emission switch 430 in FIG. 17 are identical or similar to those in FIG. 4, which are not repeated herein. The third transistor T3 and the block transistor TB in FIG. 17 are identical or similar to those in FIG. 14, which are not repeated herein.

The buffer circuit 1740 includes a bootstrap transistor TBST, a preset transistor TPR, a fourth transistor T4, a fifth transistor T5, and a second bootstrap capacitor CBST2. The bootstrap transistor TBST includes a control terminal, a first terminal, and a second terminal, wherein the control terminal is coupled to the ground level VSS, the first terminal is coupled to a fourth node N4, and the second terminal is coupled to a bootstrap node NBST.

The preset transistor TPR includes a control terminal, a first terminal, and a second terminal, wherein the control terminal is coupled to the fourth node N4, the first terminal receives a preset signal PR, and the second terminal is coupled to the fourth node N4.

The fourth transistor T4 includes a control terminal, a first terminal, and a second terminal, wherein the control terminal is coupled to the third node N3, the first terminal receives the preset signal PR, and the second terminal is coupled to the third node N3.

The fifth transistor T5 includes a control terminal, a first terminal, and a second terminal, wherein the control terminal is coupled to the bootstrap node NBST, the first terminal is coupled to the third node N3, and the second terminal receives the clock signal CLK. The second bootstrap capacitor CBST2 is coupled between the bootstrap node NBST and the third node N3.

Figure 18:
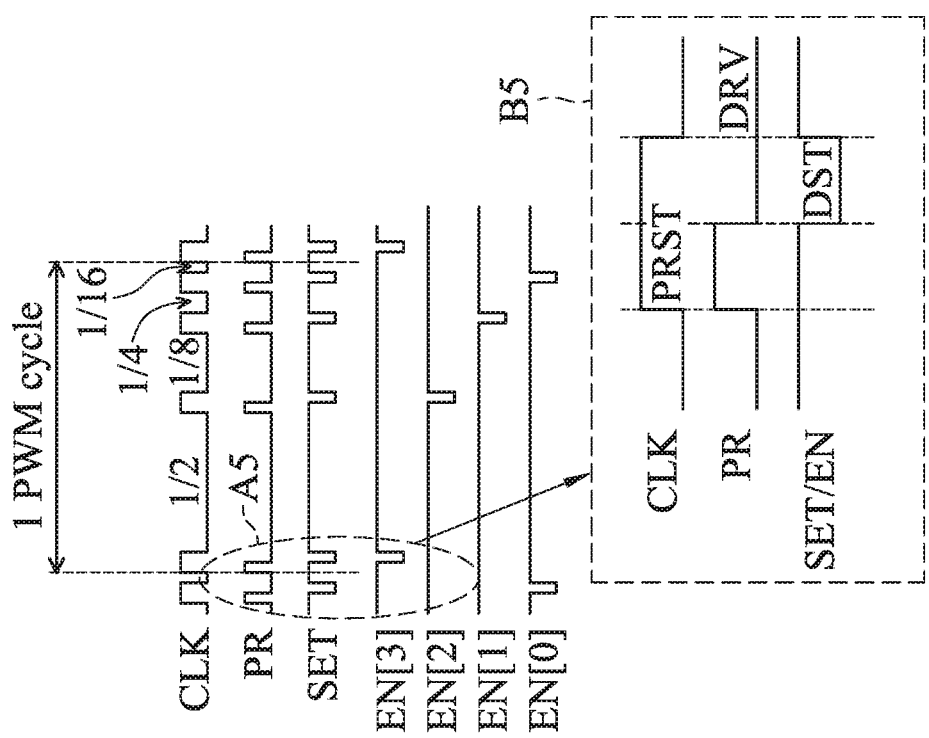
FIG. 18 illustrates a timing diagram of the driving circuit in FIG. 17 in accordance with an embodiment of the disclosure.

FIG. 18 illustrates a timing diagram of the driving circuit in FIG. 17 in accordance with an embodiment of the disclosure. As shown in FIG. 18, the area A5 has been enlarged to be the area B5.

According to an embodiment of the disclosure, when the driving circuit 1700 is operating in a preset state PRST, the clock signal CLK, the set signal SET, the preset signal PR, and at least one bit of the enable signal EN are at the high voltage level. The clock signal CLK and the preset signal PR at the high voltage level preset the emission signal SEM of the third node N3 to the high voltage level.

The preset signal PR presets the bootstrap node NBST to the high voltage level through the preset transistor TPR and the bootstrap transistor TBST. The set signal SET at the high voltage level presets the first node N1 and the second node N2 to the high voltage level through the third transistor T3. Since the set signal SET is at the high voltage level, the block transistor TB is turned OFF so that the second node N2 is isolated from the fourth node N4.

According to another embodiment of the disclosure, when the driving circuit 1700 is operating in a data-setting state DST, the clock signal CLK is at the high voltage level while a corresponding bit of the enable signal EN, the set signal SET, and the preset signal PR are at the low voltage level.

When the corresponding bit of the data signal SD stored in the storage node NS is at the low voltage level during the data-setting state DST, the corresponding bit of the data signal SD stored in the storage node NS is transmitted to the bootstrap node NBST through the second transistor T2, the block transistor TB, and the bootstrap transistor TBST. Otherwise, the first node N1, the second node N2, and the bootstrap node NBST are still at the high voltage level.

According to yet another embodiment of the disclosure, when the driving circuit 1700 is operating in a drive state DRV, the clock signal CLK and the preset signal PR are at the low voltage level while the set signal SET and at least one bit of the enable signal EN are at the high voltage level. The fifth transistor T5 drives the emission transistor TEM according to the voltage level of the bootstrap node NBST.

When the bootstrap node NBST is at the high voltage level during the drive state DRV, the fifth transistor T5 is turned OFF so that the emission signal SEM of the third node N3 is still at the high voltage level to turn OFF the emission transistor TEM.

When the bootstrap node NBST is at the low voltage level during the drive state DRV, the fifth transistor T5 is turned ON to pull the emission signal SEM of the third node N3 to the low voltage level. When the third node N3 is discharged through the fifth transistor T5, a negative pulse is generated at the third node N3. Meanwhile, the negative pulse of the third node N3 is coupled to the bootstrap node NBST through the second bootstrap capacitor CBST2 to turn ON the fifth transistor T5 and to pull the emission signal SEM of the third node N3 as low as the low voltage level.

According to yet another embodiment of the disclosure, when the driving circuit 1700 is operating in a data-writing state DW, the set signal SET and at least one bit of the enable signal EN is at the high voltage level while a corresponding bit of the scan signal SN is at the low voltage level. A corresponding PWM unit 411 receives and stores the corresponding bit of the data signal SD in response to the corresponding bit of the scan signal SN at the low voltage level.

According to an embodiment of the disclosure, the data-writing state DW may be operated during the preset state PRST. According to another embodiment of the disclosure, the data-writing state DW may be operated during the drive state DRV. In other words, since the set signal SET is at the high voltage level during the preset state PRST and the drive state DRV to isolate the PWM circuit 410 from the buffer circuit 1740, the data-writing state DW for receiving another data signal SD can be operated during the preset state PRST or the drive state DRV. Namely, the data-writing state DW may be operated during the PWM cycle so that the period for illuminating the light emitting unit XLED may not be shortened.

However, the set signal SET and a corresponding bit of the enable signal EN are at the low voltage level during the data-setting state DST so that it is not suitable for the PWM circuit 410 to receive another data signal SD.

Figure 19:
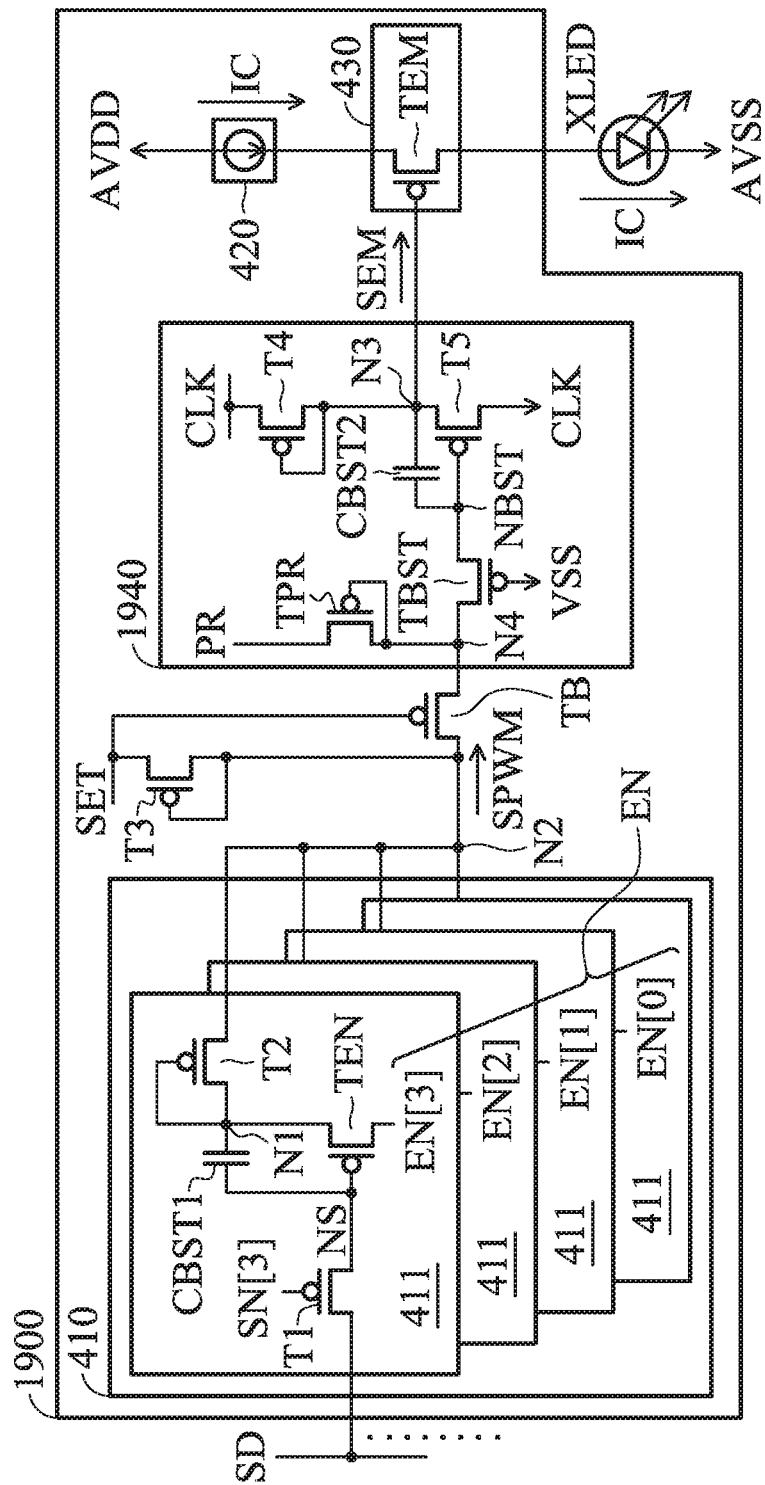
FIG. 19 illustrates a schematic diagram of a driving circuit in accordance with another embodiment of the disclosure.

FIG. 19 is a schematic diagram of a driving circuit in accordance with another embodiment of the disclosure. According to an embodiment of the disclosure, the driving circuit 1900 corresponds to the driving circuit 200 in FIG. 2. According to an embodiment of the disclosure, the driving circuit 1900 is implemented by P-type transistors.

The driving circuit 1900 is similar to the driving circuit 1700, except that the buffer circuit 1740 in FIG. 17 has been replaced with the buffer circuit 1940. Comparing buffer circuit 1940 with buffer circuit 1740 in FIG. 17, it is clear that the fourth transistor T4 in FIG. 17 has been modified.

As shown in FIG. 19, the fourth transistor T4 includes a control terminal, a first terminal, and a second terminal, wherein the control terminal is coupled to the third node N3, the first terminal receives the clock signal CLK, and the second terminal is coupled to the third node N3.

In other words, the fourth transistor T4 in FIG. 19 is supplied by the clock signal CLK, instead of the preset signal PR as shown in FIG. 17. The operations of the driving circuit 1900 are identical or similar to those of the driving circuit 1700 in FIG. 17, which are not repeated herein.

Figure 20:
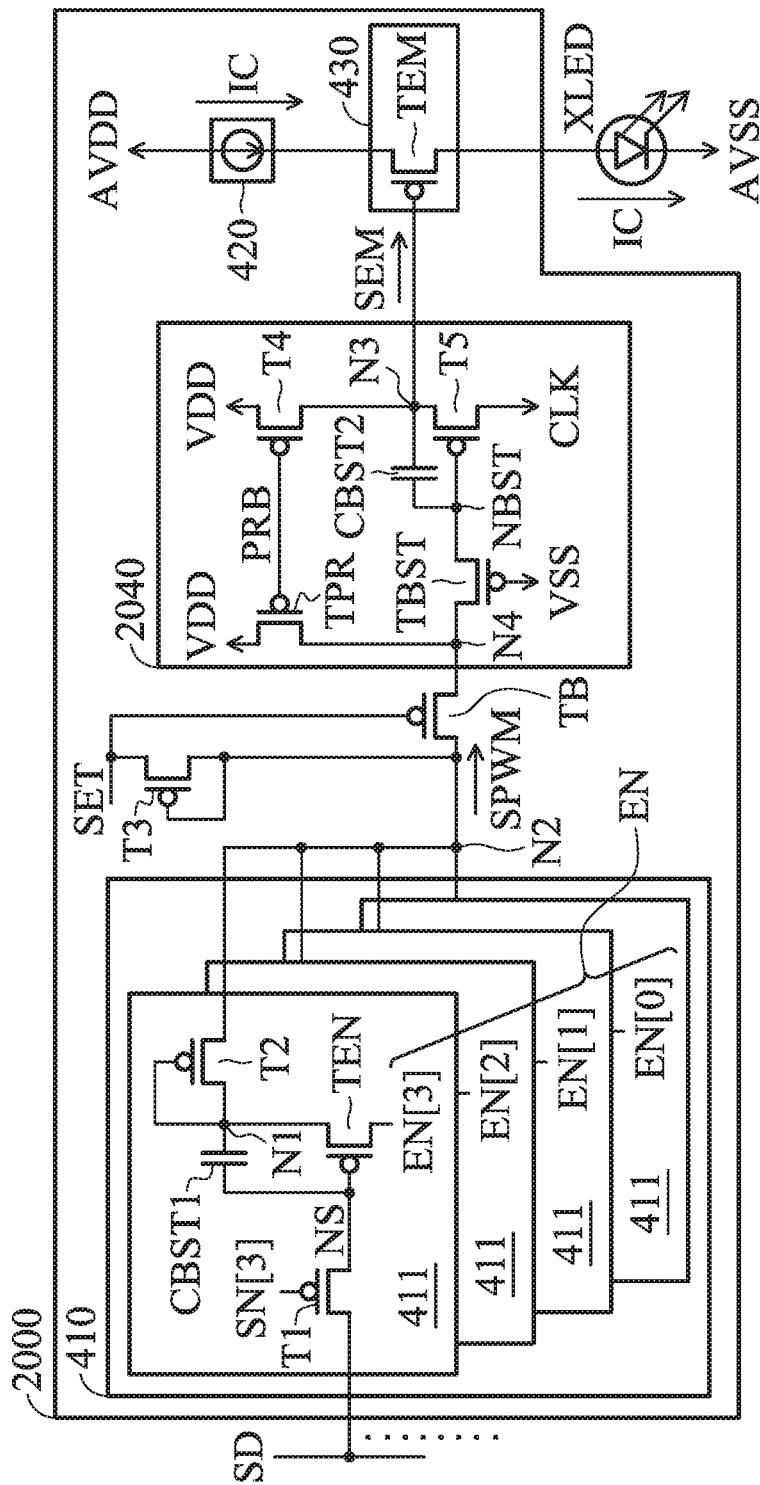
FIG. 20 is a schematic diagram of a driving circuit in accordance with another embodiment of the disclosure.

FIG. 20 is a schematic diagram of a driving circuit in accordance with another embodiment of the disclosure. According to an embodiment of the disclosure, the driving circuit 2000 corresponds to the driving circuit 200 in FIG. 2. According to an embodiment of the disclosure, the driving circuit 2000 is implemented by P-type transistors.

The driving circuit 2000 is similar to the driving circuit 1700, except that buffer circuit 1740 in FIG. 17 has been replaced with buffer circuit 2040. If one compares buffer circuit 2040 with buffer circuit 1740 in FIG. 17, one will see that the fourth transistor T4 and the preset transistor TPR in FIG. 17 have been modified.

As shown in FIG. 20, the fourth transistor T4 includes a control terminal, a first terminal, and a second terminal, wherein the control terminal receives a reverse preset signal PRB, the first terminal is coupled to the supply voltage VDD, and the second terminal is coupled to the third node N3. According to an embodiment of the disclosure, the reverse preset signal PRB is an inverse of the preset signal PR in FIG. 17.

The preset transistor TPR includes a control terminal, a first terminal, and a second terminal, wherein the control terminal receives the reverse preset signal PRB, the first terminal is coupled to the supply voltage VDD, and the second terminal is coupled to the fourth node N4. The operations of the driving circuit 2000 are identical or similar to those of the driving circuit 1700 in FIG. 17 with the reverse preset signal PRB substituted for the preset signal PR, which are not repeated herein.

Figure 21:
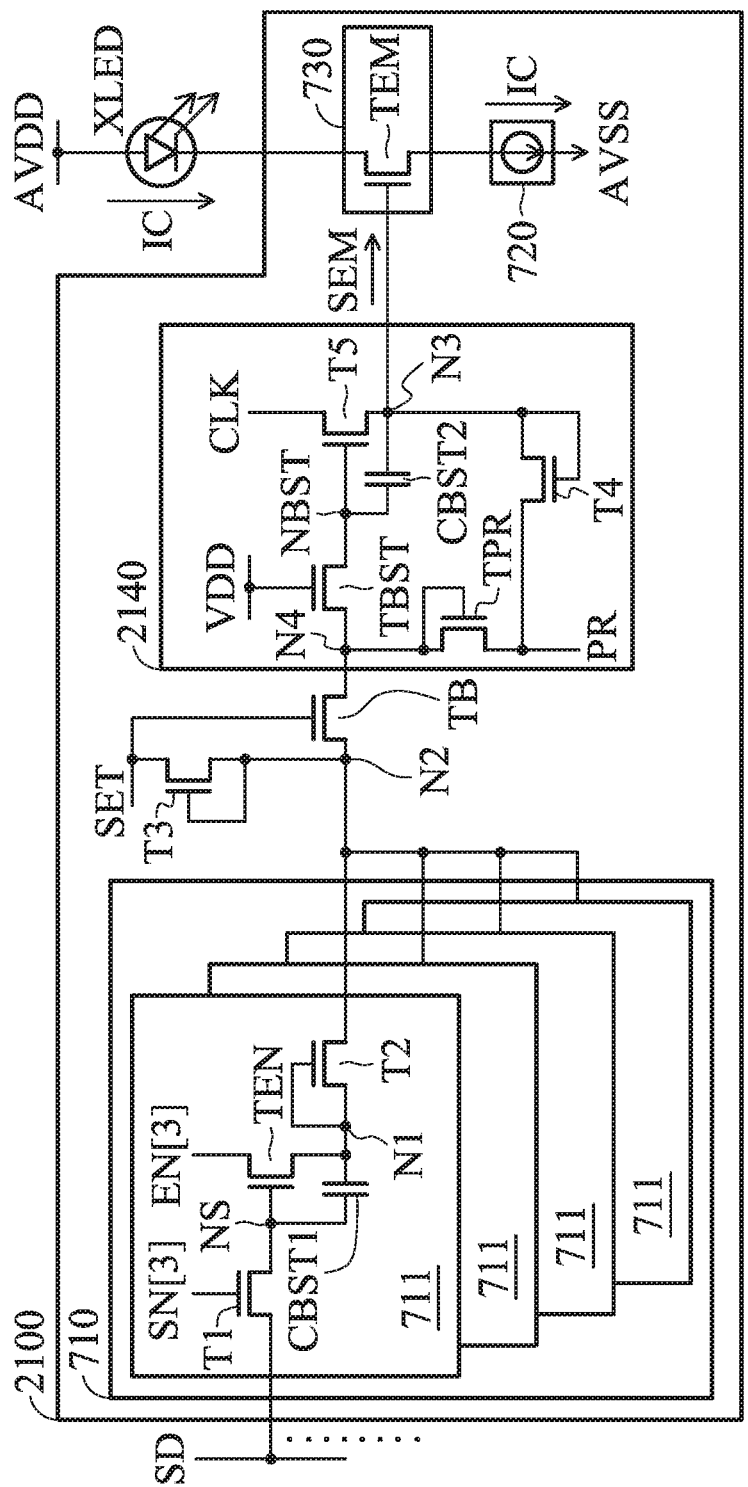
FIG. 21 is a schematic diagram of the driving circuit in accordance with another embodiment of the disclosure.

FIG. 21 is a schematic diagram of the driving circuit in accordance with another embodiment of the disclosure. According to an embodiment of the disclosure, the driving circuit 2100 corresponds to the driving circuit 300 in FIG. 3. According to an embodiment of the disclosure, the driving circuit 2100 is implemented by N-type transistors.

As shown in FIG. 21, the driving circuit 2100 includes a PWM circuit 710, a current source 720, an emission switch 730, and a buffer circuit 2140. One will see, if one compares the driving circuit 2100 with the driving circuit 1700 in FIG. 17, all the P-type transistors in FIG. 17 are replaced with N-type transistors with some proper modifications. The operations of the driving circuit 2100 are identical or similar to those of the driving circuit 1700 in FIG. 17, which are not repeated herein.

Figure 22:
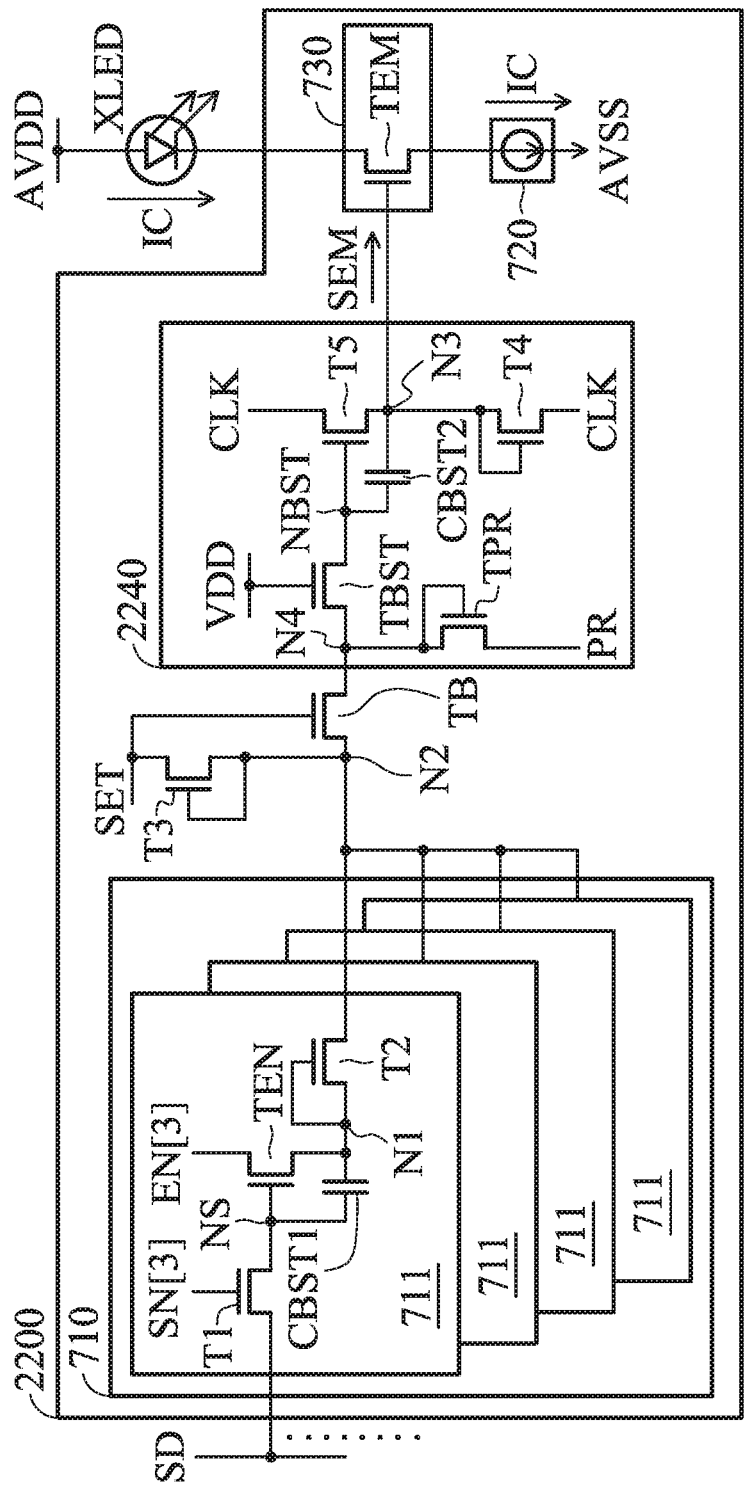
FIG. 22 is a schematic diagram of the driving circuit in accordance with another embodiment of the disclosure.

FIG. 22 is a schematic diagram of the driving circuit in accordance with another embodiment of the disclosure. According to an embodiment of the disclosure, the driving circuit 2200 corresponds to the driving circuit 300 in FIG. 3. According to an embodiment of the disclosure, the driving circuit 2200 is implemented by N-type transistors.

As shown in FIG. 22, the driving circuit 2200 includes a PWM circuit 710, a current source 720, an emission switch 730, and a buffer circuit 2240. One will see, if one compares the driving circuit 2100 with the driving circuit 1900 in FIG. 19, all the P-type transistors in FIG. 19 are replaced with N-type transistors with some proper modifications. The operations of the driving circuit 2200 are identical or similar to those of the driving circuit 1900 in FIG. 19, which are not repeated herein.

Figure 23:
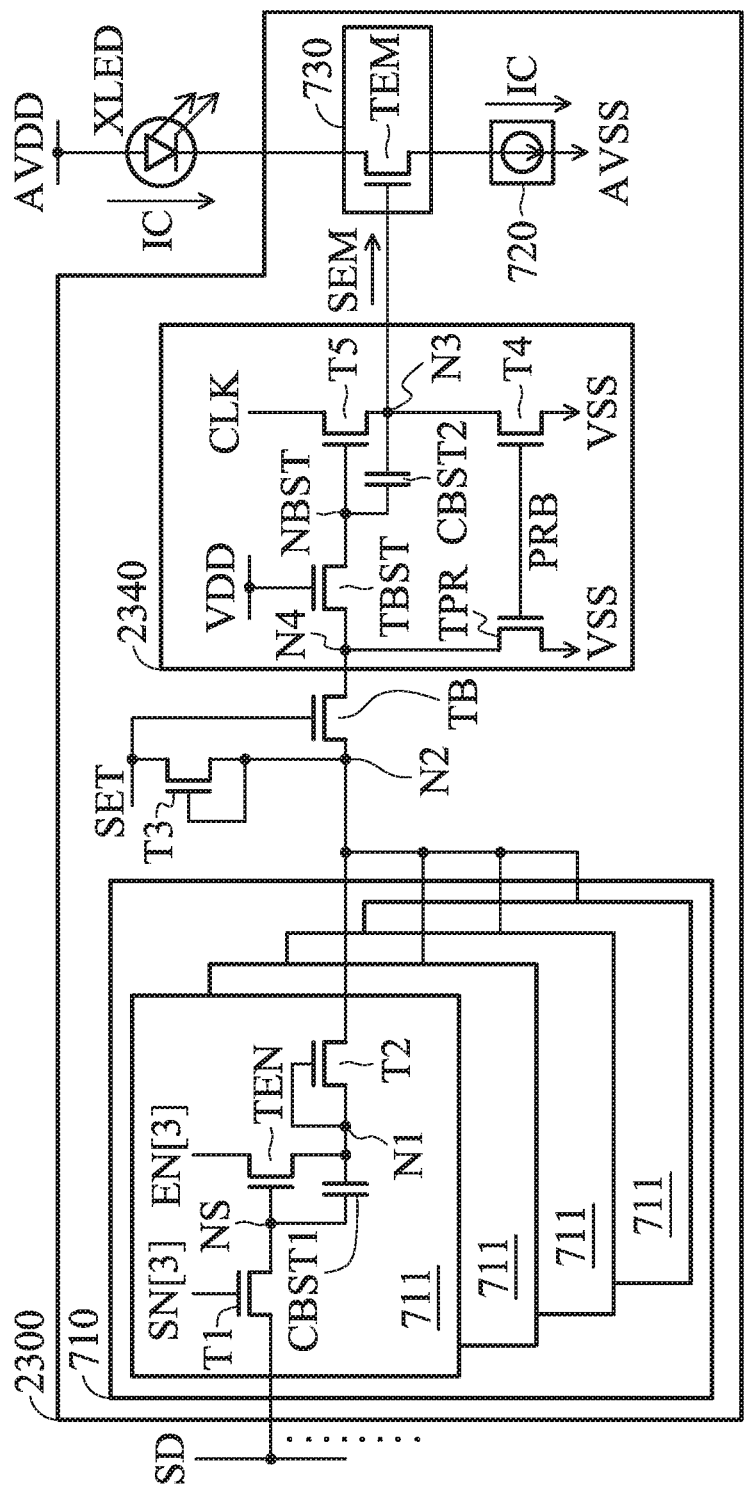
FIG. 23 is a schematic diagram of the driving circuit in accordance with another embodiment of the disclosure.

FIG. 23 is a schematic diagram of the driving circuit in accordance with another embodiment of the disclosure. According to an embodiment of the disclosure, the driving circuit 2300 corresponds to the driving circuit 300 in FIG. 3. According to an embodiment of the disclosure, the driving circuit 2300 is implemented by N-type transistors.

As shown in FIG. 23, the driving circuit 2300 includes a PWM circuit 710, a current source 720, an emission switch 730, and a buffer circuit 2340. One will see, if one compares the driving circuit 2100 with the driving circuit 2000 in FIG. 20, all the P-type transistors in FIG. 20 are replaced with N-type transistors with some proper modifications. The operations of the driving circuit 2300 are identical or similar to those of the driving circuit 2000 in FIG. 20, which are not repeated herein.

Figure 24:
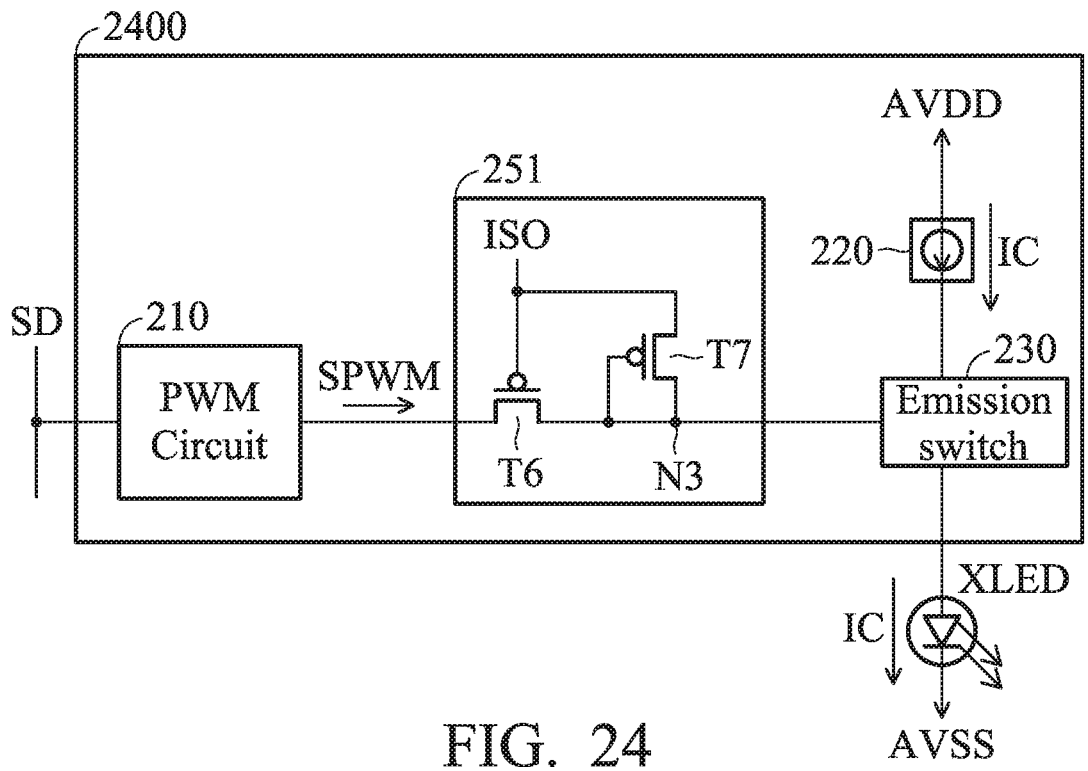
FIG. 24 is a block diagram of a driving circuit in accordance with another embodiment of the disclosure.

FIG. 24 is a block diagram of a driving circuit in accordance with another embodiment of the disclosure. One will see, if one compares the driving circuit 2400 with the driving circuit 200 in FIG. 2, the driving circuit 2400 further includes an isolation circuit 251. According to an embodiment of the disclosure, the isolation circuit 251 may isolate the PWM circuit 210 from the emission switch 230 according to an isolation signal ISO.

As shown in FIG. 24, the isolation circuit 251 includes a sixth transistor T6 and a seventh transistor T7. The sixth transistor T6 includes a control terminal, a first terminal, and a second terminal, wherein the control terminal receives the isolation signal ISO, the first terminal receives the PWM signal SPWM, and the second terminal is coupled to the third node N3.

The seventh transistor T7 includes a control terminal, a first terminal, and a second terminal, wherein the control terminal is coupled to the third node N3, the first terminal receives the isolation signal ISO, and the second terminal is coupled to the third node N3.

According to an embodiment of the disclosure, when the isolation signal ISO is in the supply voltage VDD, the sixth transistor T6 is turned OFF and the isolation signal ISO pulls the third node N3 to the supply voltage VDD through the seventh transistor T7.

According to another embodiment of the disclosure, when the isolation signal ISO is at the low voltage level, the sixth transistor T6 is turned ON so that the PWM circuit 210 is able to provide the PWM signal SPWM to the emission switch 230. When the third node N3 is at the high voltage level, the seventh transistor T7 is turned OFF. When the third node N3 is at the low voltage level, the control terminal, the first terminal, and the second terminal of the seventh transistor T7 are coupled to the low voltage level so that the seventh transistor T7 has no influence to the third node N3.

According to some embodiments of the disclosure, the driving circuit 2400 may further include the third transistor T3 in FIG. 4, the third transistor T3' in FIG. 6, the third transistor T3 and the buffer circuit 840 in FIG. 8, the buffer circuit 1140 in FIG. 11, the third transistor T3, the block transistor TB, and the buffer circuit 1440 in FIG. 14, the third transistor T3, the block transistor TB, and the buffer circuit 1740 in FIG. 17, the third transistor T3, the block transistor TB, and the buffer circuit 1940 in FIG. 19, or the third transistor T3, the block transistor TB, and the buffer circuit 2040 in FIG. 20, which may be coupled between the PWM circuit 210 and the isolation circuit 251.

Figure 25:
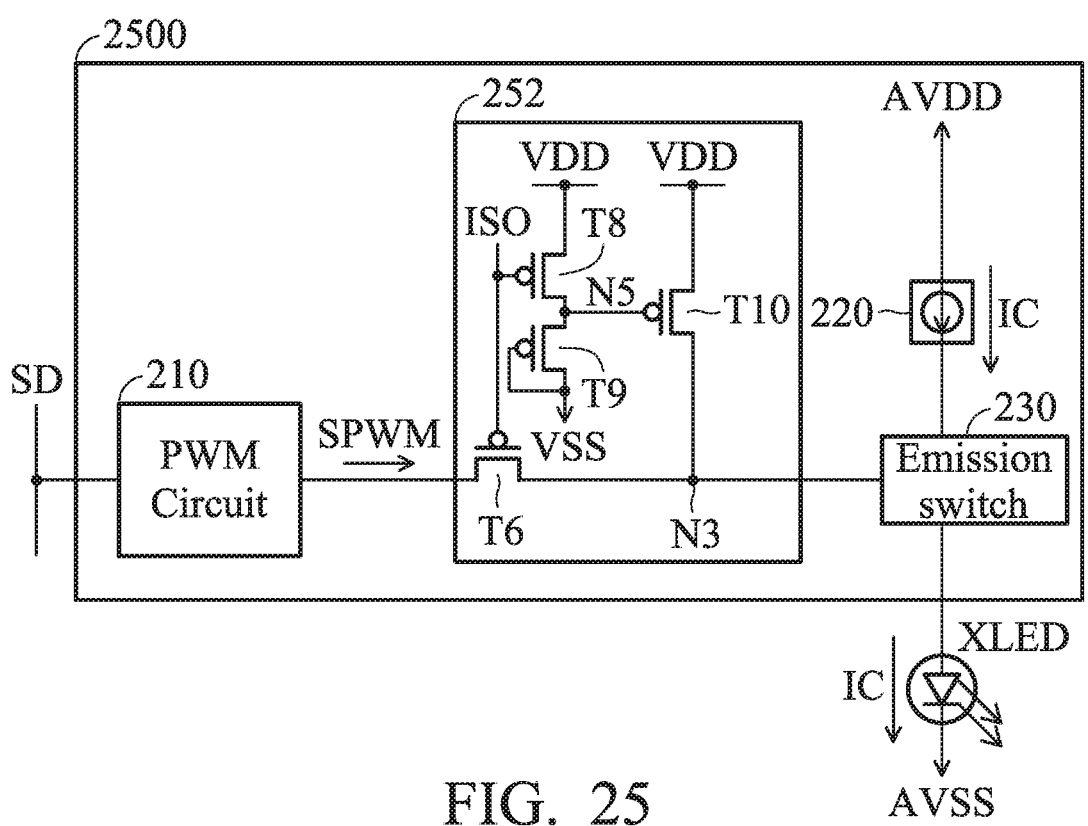
FIG. 25 is a block diagram of a driving circuit in accordance with another embodiment of the disclosure.

FIG. 25 is a block diagram of a driving circuit in accordance with another embodiment of the disclosure. One will see, if one compares the driving circuit 2500 with the driving circuit 2400 in FIG. 24, the isolation circuit 251 in FIG. 24 is replaced with the isolation circuit 252.

The isolation circuit 252 includes a sixth transistor T6, an eighth transistor T8, a ninth transistor T9, and a tenth transistor T10. The sixth transistor T6 includes a control terminal, a first terminal, and a second terminal, wherein the control terminal receives the isolation signal ISO, the first terminal receives the PWM signal SPWM, and the second terminal is coupled to the third node N3.

The eighth transistor T8 includes a control terminal, a first terminal, and a second terminal, wherein the control terminal receives the isolation signal ISO, the first terminal is coupled to the supply voltage VDD, and the second terminal is coupled to a fifth node N5.

The ninth transistor T9 includes a control terminal, a first terminal, and a second terminal, wherein the control terminal is coupled to the ground level VSS, the first terminal is coupled to the fifth node N5, and the second terminal is coupled to the ground level VSS.

The tenth transistor T10 includes a control terminal, a first terminal, and a second terminal, wherein the control terminal is coupled to the fifth node N5, the first terminal is coupled to the supply voltage VDD, and the second terminal is coupled to the third node N3.

According to an embodiment of the disclosure, when the isolation signal ISO is in the supply voltage VDD, the sixth transistor T6 is turned OFF. The eighth transistor T8 and the ninth transistor T9 are configured as an inverter to turn ON the tenth transistor T10 according to the isolation signal ISO at the high voltage level so that the tenth transistor T10 provides supply voltage VDD to the third node N3.

According to another embodiment of the disclosure, when the isolation signal ISO is at the low voltage level, the sixth transistor T6 is turned ON so that the PWM circuit 210 is able to provide the PWM signal SPWM to the emission switch 230. The eighth transistor T8 and the ninth transistor T9 are configured as an inverter to turn OFF the tenth transistor T10 according to the isolation signal ISO at the low voltage level.

According to some embodiments of the disclosure, the driving circuit 2500 may further include the third transistor T3 in FIG. 4, the third transistor T3' in FIG. 6, the third transistor T3 and the buffer circuit 840 in FIG. 8, the buffer circuit 1140 in FIG. 11, the third transistor T3, the block transistor TB, and the buffer circuit 1440 in FIG. 14, the third transistor T3, the block transistor TB, and the buffer circuit 1740 in FIG. 17, the third transistor T3, the block transistor TB, and the buffer circuit 1940 in FIG. 19, or the third transistor T3, the block transistor TB, and the buffer circuit 2040 in FIG. 20, which may be coupled between the PWM circuit 210 and the isolation circuit 252.

Figure 26:
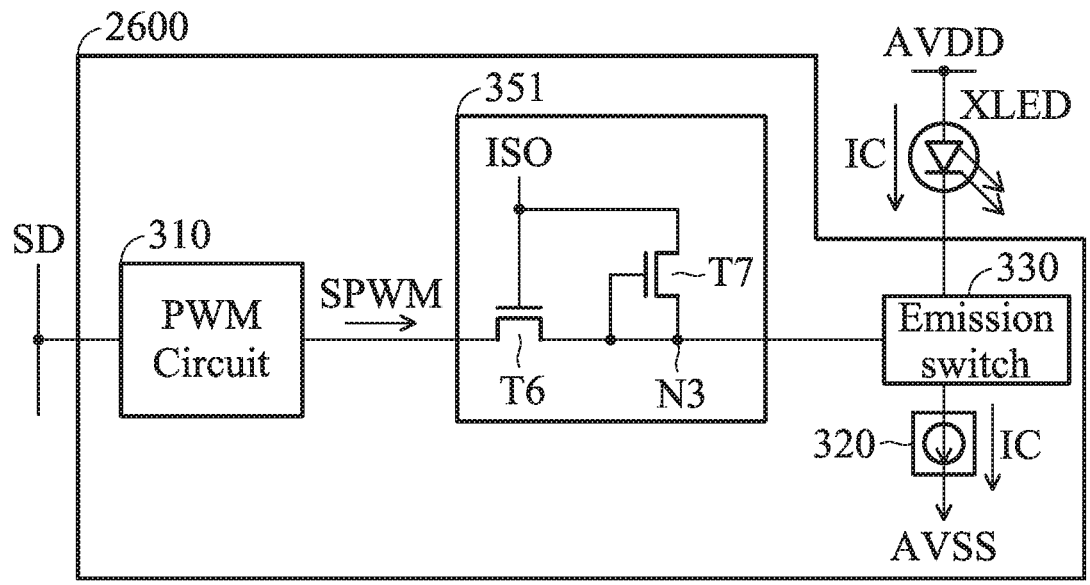
FIG. 26 is a block diagram of a driving circuit in accordance with another embodiment of the disclosure.

FIG. 26 is a block diagram of a driving circuit in accordance with another embodiment of the disclosure. One will see, if one compares the driving circuit 2600 with the driving circuit 300 in FIG. 3, the driving circuit 2600 further includes an isolation circuit 351. According to an embodiment of the disclosure, the isolation circuit 351 isolates the PWM circuit 310 from the emission switch 330 according to an isolation signal ISO.

One will see, if one compares the isolation circuit 351 with the isolation circuit 251 in FIG. 24, all the P-type transistors in FIG. 24 are replaced with N-type transistors with some proper modifications. The operation of the isolation circuit 351 is identical or similar to that of the isolation circuit 251 in FIG. 24, which is not repeated herein.

According to some embodiments of the disclosure, the driving circuit 2600 may further include the third transistor T3 in FIG. 7, the third transistor T3 and the buffer circuit 1040 in FIG. 10, the buffer circuit 1340 in FIG. 13, the third transistor T3, the block transistor TB, and the buffer circuit 1640 in FIG. 16, the third transistor T3, the block transistor TB, and the buffer circuit 2140 in FIG. 21, the third transistor T3, the block transistor TB, and the buffer circuit 2240 in FIG. 22, or the third transistor T3, the block transistor TB, and the buffer circuit 2340 in FIG. 23, which may be coupled between the PWM circuit 310 and the isolation circuit 351.

Figure 27:
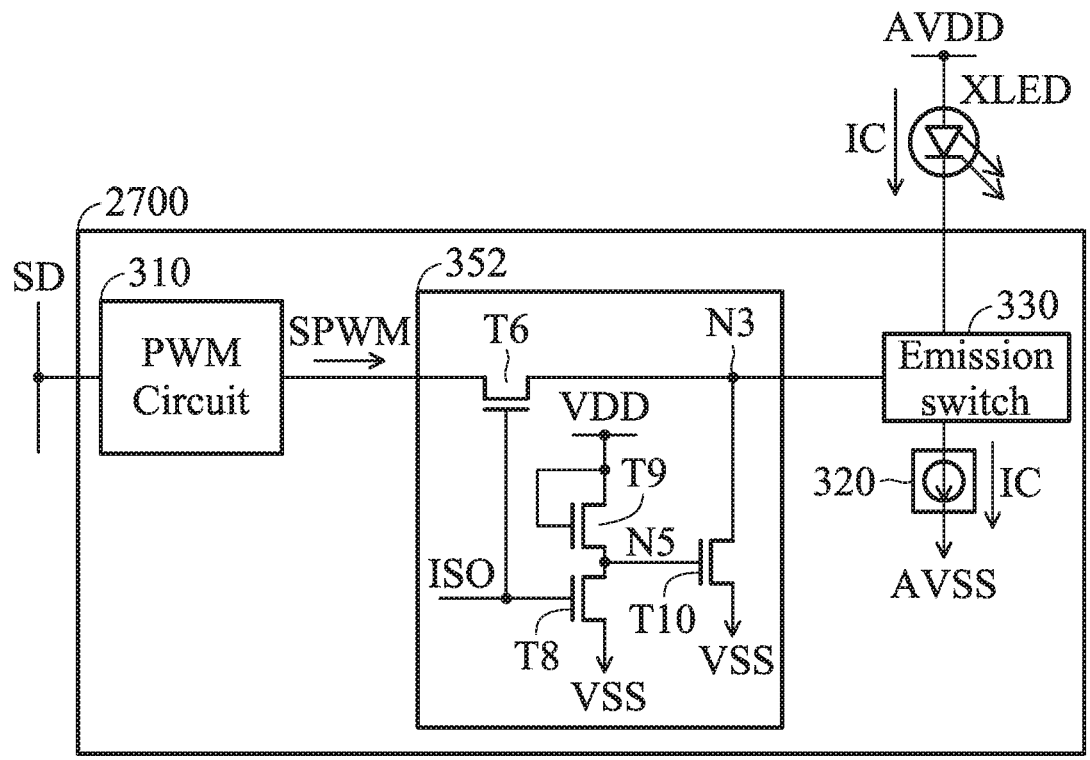
FIG. 27 is a block diagram of a driving circuit in accordance with another embodiment of the disclosure.

FIG. 27 is a block diagram of a driving circuit in accordance with another embodiment of the disclosure. One will see, if one compares the driving circuit 2700 with the driving circuit 300 in FIG. 3, the driving circuit 2700 further includes an isolation circuit 352. According to an embodiment of the disclosure, the isolation circuit 352 isolates the PWM circuit 310 from the emission switch 330 according to an isolation signal ISO.

One will see, if one compares the isolation circuit 352 with the isolation circuit 252 in FIG. 25, all the P-type transistors in FIG. 25 are replaced with N-type transistors with some proper modifications. The operation of the isolation circuit 352 is identical to that of the isolation circuit 252 in FIG. 25, which is not repeated herein.

According to some embodiments of the disclosure, the driving circuit 2700 may further include the third transistor T3 in FIG. 7, the third transistor T3 and the buffer circuit 1040 in FIG. 10, the buffer circuit 1340 in FIG. 13, the third transistor T3, the block transistor TB, and the buffer circuit 1640 in FIG. 16, the third transistor T3, the block transistor TB, and the buffer circuit 2140 in FIG. 21, the third transistor T3, the block transistor TB, and the buffer circuit 2240 in FIG. 22, or the third transistor T3, the block transistor TB, and the buffer circuit 2340 in FIG. 23, which may be coupled between the PWM circuit 310 and the isolation circuit 352.

Figure 28:
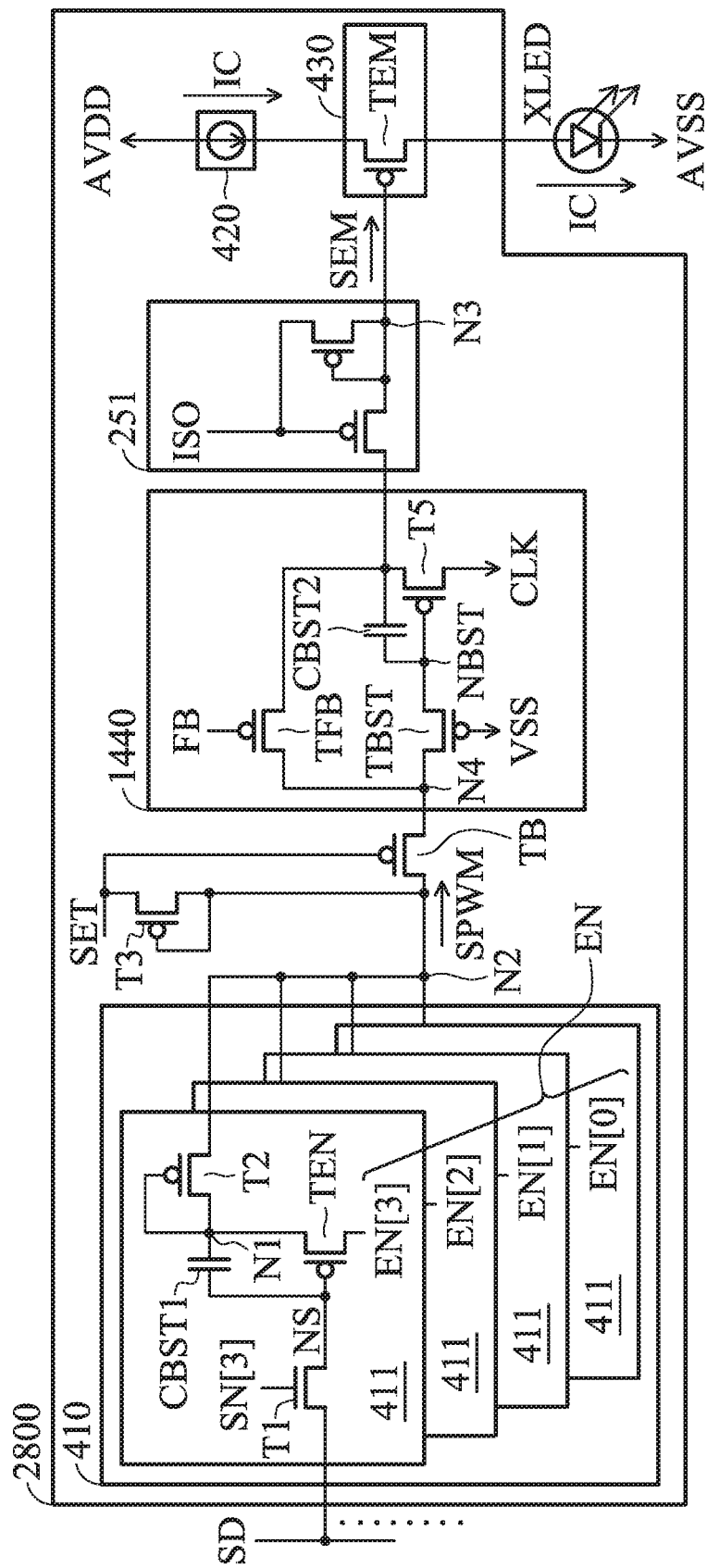
FIG. 28 is a block diagram of a driving circuit in accordance with another embodiment of the disclosure.

FIG. 28 is a block diagram of a driving circuit in accordance with another embodiment of the disclosure. As shown in FIG. 28, the driving circuit 2800 includes a PWM circuit 410, a current source 420, an emission switch 430, a buffer circuit 1440, and an isolation circuit 251, in which the first transistor T1 of the PWM unit 411 is an N-type transistor. Namely, the driving circuit 2800 may be implemented by mixed N-type and P-type transistors.

According to other embodiments of the disclosure, the driving circuit 2800 implemented by mixed N-type and P-type transistors is merely illustrated herein, but not intended to be limited thereto. In other words, each transistor in FIGS. 4, 6, 8, 11, 14, 17, 19, 20, and 24-25 can be replaced with an N-type transistor with some proper modifications.

Figure 29:
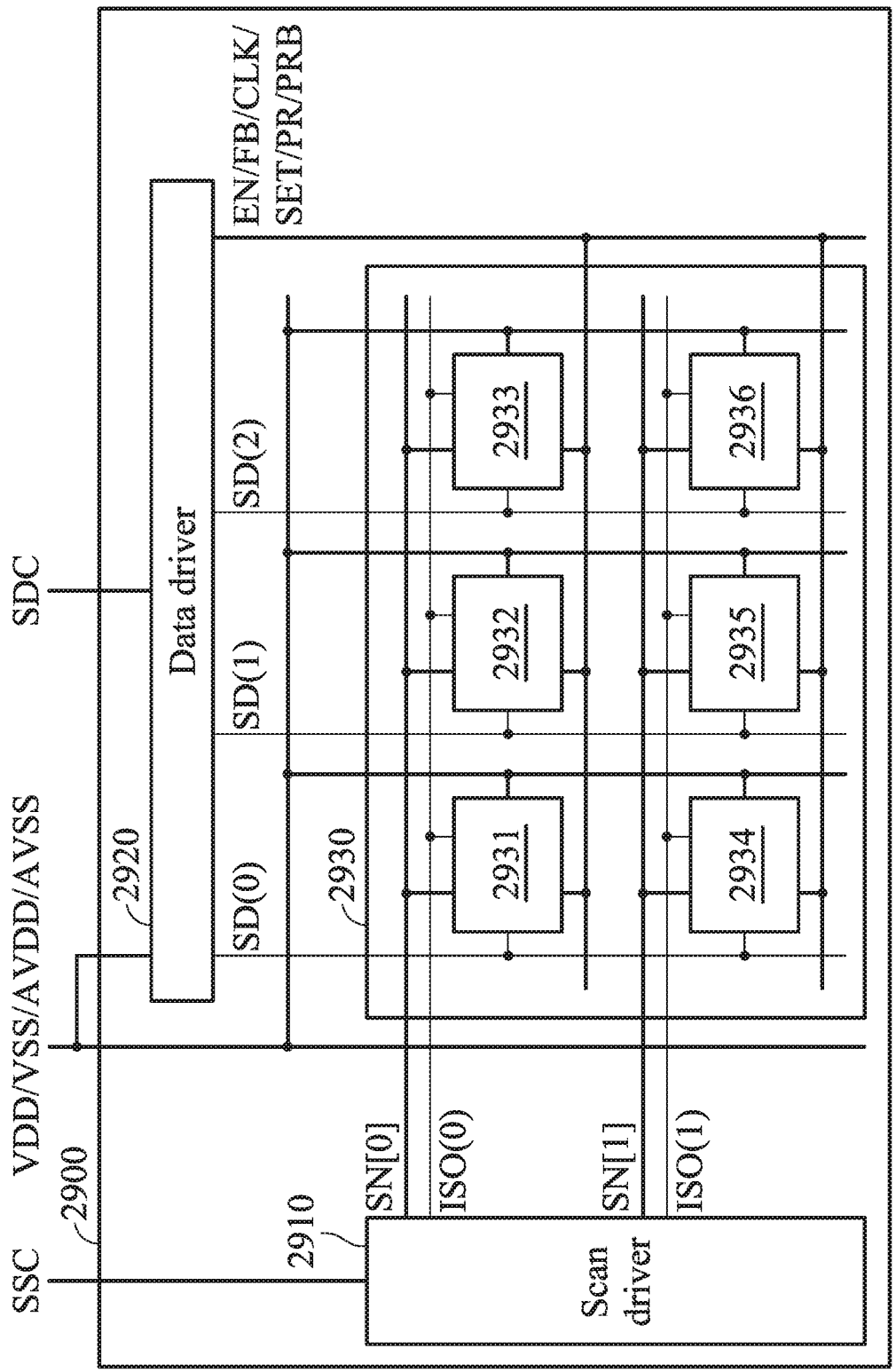
FIG. 29 illustrates a block diagram of a panel in accordance with an embodiment of the disclosure.

FIG. 29 illustrates a block diagram of a panel in accordance with an embodiment of the disclosure. As shown in FIG. 29, the panel 2900 includes a scan driver 2910, a data driver 2920, and an active area 2930. The scan driver 2910 receives the scan control signal SSC to generate scan signals SN[0], SN[1] and isolation signals ISO(0), ISO(1). According to some embodiments of the disclosure, the scan signals SN[0], SN[1] correspond to the scan signal SN in FIGS. 4, 6-8, 10, 11, 13-14, 16-17, and 19-28.

The data driver 2920 receives the data control signal SDC to generate the data signals SD(0), SD(1), SD(2), the preset signal PR, the reverse preset signal PRB, the feedback signal FB, the set signal SET, the clock signal CLK, and the enable signal EN. According to some embodiments of the disclosure, the data signals SD(0), SD(1), SD(2) and the enable signal EN correspond to the data signal SD and the enable signal EN in FIGS. 4, 6-8, 10, 11, 13-14, 16-17, and 19-28 respectively.

The preset signal PR in FIG. 29 corresponds to the preset signal PR in FIGS. 4, 7, 11, 13, 19, 21, and 22, and the reverse preset signal PRB in FIG. 29 corresponds to that in FIGS. 6, 20, and 23. The feedback signal FB in FIG. 29 corresponds to the feedback signal FB in FIGS. 14 and 16. The clock signal CLK in FIG. 29 corresponds to the clock signal in FIGS. 8, 10, 11, 13, 14, 16, 17, and 19-23. The set signal SET in FIG. 29 corresponds to the set signal SET in FIGS. 14, 16, 17, and 19-23.

The active area 2930 includes a plurality of pixel circuits 2931~2936, and at least one of the pixel circuit 2931~2936 corresponds to the driving circuit and the light emitting unit in FIGS. 4, 6-8, 10, 11, 13-14, 16-17, and 19-28. The supply voltage VDD and the ground level VSS are supplied to the data driver 2920 and the pixel circuits 2931~2936. The supply voltage AVDD and the supply voltage AVSS are supplied to the pixel circuits 2931~2936.

While the disclosure has been described by way of example and in terms of preferred embodiment, it should be understood that the disclosure is not limited thereto. Those who are skilled in this technology can still make various alterations and modifications without departing from the scope and spirit of this disclosure. Therefore, the scope of the present disclosure shall be defined and protected by the following claims and their equivalents. Moreover, each of the claims constitutes an individual embodiment, and the scope of the disclosure also includes the scope of the various claims and combinations of the embodiments. The scope of the disclosure is subject to the definition of the scope of the claims.

What is claimed is:

1. A driving circuit for driving a light emitting unit, comprising:
   a current source, generating a current;
   a PWM circuit, storing a data signal according to a scan signal and generating a PWM signal according to the data signal and an enable signal; and
   an emission switch, coupling the current source to the light emitting unit according to the PWM signal so that the current flows through the light emitting unit,
   wherein the scan signal, the data signal and the enable signal are N bits, wherein N is a positive integer,
   wherein the PWM circuit comprises N PWM units and each of the PWM units stores a corresponding bit of the data signal at a storage node according to a corresponding bit of the scan signal,
   wherein each of the PWM units passes the corresponding bit of the data signal stored at the storage node to a second node according to a corresponding bit of the enable signal, so that the PWM signal is generated at the second node;
   wherein at least one of the PWM units comprises:
      a first transistor, passing the corresponding bit of the data signal to the storage node according to the corresponding bit of the scan signal;
      an enable transistor, comprising a control terminal, a first terminal, and a second terminal,
      wherein the control terminal is coupled to the storage node, the first terminal is coupled to a first node, and the second terminal receives the corresponding bit of the enable signal;
      a first bootstrap capacitor, coupled between the storage node and the first node; and
      a second transistor, comprising a control terminal, a first terminal, and a second terminal,
      wherein the control terminal is coupled to the first node, the first terminal is coupled to the first node, and the second terminal is coupled to the second node.

2. The driving circuit of claim 1, wherein the driving circuit is implemented by either P-type transistors or N-type transistors.

3. The driving circuit of claim 1, further comprising:
   a third transistor, comprising a control terminal, a first terminal, and a second terminal, wherein the control terminal is coupled to the second node, the first terminal receives a preset signal, and a second terminal is coupled to the second node.

4. The driving circuit of claim 1, further comprising:
   a third transistor, comprising a control terminal, a first terminal, and a second terminal, wherein the control terminal receives a reverse preset signal, the first terminal is supplied by a supply voltage, and a second terminal is coupled to the second node.

5. The driving circuit of claim 3, wherein when the driving circuit is operating in a preset state, the preset signal and the enable signal are at a high voltage level so that the PWM signal is preset to the high voltage level to turn OFF the emission switch.

6. The driving circuit of claim 3, wherein when the driving circuit is operating in a data-writing state, the scan signal is at a low voltage level while the preset signal and the enable signal are at a high voltage level so that the first node of each of the PWM units stores the corresponding bit of the data signal.

7. The driving circuit of claim 3, wherein when the driving circuit is operating in a drive state, the scan signal is at a high voltage level while the preset signal and the corresponding bit of the enable signal are at a low voltage level so that the corresponding PWM unit passes the corresponding bit of the data signal stored at the storage node to the second node to drive the emission switch.

8. The driving circuit of claim 1, further comprising:
   a buffer circuit, receiving the PWM signal to generate an emission signal at a third node so that the emission switch couples the current to the light emitting unit according to the emission signal.

9. The driving circuit of claim 8, wherein the buffer circuit comprises:
   a bootstrap transistor, comprising a control terminal, a first terminal, and a second terminal, wherein the control terminal is coupled to a ground level, the first terminal is coupled to the second node, and the second terminal is coupled to a bootstrap node;
   a preset transistor, comprising a control terminal, a first terminal, and a second terminal, wherein the control terminal receives a preset signal, the first terminal is coupled to the second node, and the second terminal is coupled to the third node; a fifth transistor, comprising a control terminal, a first terminal, and a second terminal, wherein the control terminal is coupled to the bootstrap node, the first terminal is coupled to the third node, and the second terminal receives the clock signal; and a second bootstrap capacitor, coupled between the bootstrap node and the third node.

10. The driving circuit of claim 9, wherein when the driving circuit is operating in a preset state, the clock signal and the enable signal are at a high voltage level while the preset signal is at a low voltage level so that the first node of each of the PWM units, the second node, and the bootstrap node are preset to the high voltage level.

11. The driving circuit of claim 9, wherein when the driving circuit is operating in a data-writing state, the scan signal and the preset signal are at the low voltage level while the clock signal and the enable signal are at the high voltage level so that the first node of each of the PWM units stores the corresponding bit of the data signal.

12. The driving circuit of claim 9, wherein when the driving circuit is operating in a drive state, the scan signal and the preset signal are at the high voltage level while the clock signal and the corresponding bit of the enable signal are at the low voltage level so that corresponding PWM unit passes the corresponding bit of the data signal from the storage node to the second node and the buffer circuit transmits the PWM signal to the third node to turn ON the emission switch.

13. The driving circuit of claim 8, further comprising:
   a third transistor, comprising a control terminal, a first terminal, and a second terminal, wherein the control terminal is coupled to the second node, the first terminal receives a clock signal, and a second terminal is coupled to the second node.

14. The driving circuit of claim 13, wherein the buffer circuit comprises:
   a bootstrap transistor, comprising a control terminal, a first terminal, and a second terminal, wherein the control terminal is coupled to a ground level, the first terminal is coupled to the second node, and the second terminal is coupled to a bootstrap node;
   a fourth transistor, comprising a control terminal, a first terminal, and a second terminal, wherein the control terminal is coupled to the third node, the first terminal receives the clock signal, and the second terminal is coupled to the third node; a fifth transistor, comprising a control terminal, a first terminal, and a second terminal, wherein the control terminal is coupled to the bootstrap node, the first terminal is coupled to the third node, and the second terminal receives the clock signal; and a second bootstrap capacitor, coupled between the bootstrap node and the third node.

15. The driving circuit of claim 14, wherein when the driving circuit is operating in a preset state, the clock signal and the enable signal are at a high voltage level so that the first node, the second node, and the bootstrap node are preset to the high voltage level and the emission signal is preset to the high voltage level by the fourth transistor to turn OFF the emission switch.

16. The driving circuit of claim 14, wherein when the driving circuit is operating in a data-writing state, the scan signal is at a low voltage level while the clock signal and the enable signal are at the high voltage level so that the storage node of each of the PWM units stores the corresponding bit of the data signal.

17. The driving circuit of claim 14, wherein when the driving circuit is operating in a drive state, the scan signal is at the high voltage level while the clock signal and the corresponding bit of the enable signal are at the low voltage level so that the corresponding PWM unit passes the corresponding bit of the data signal stored at the storage node to the second node and the buffer circuit transmits the PWM signal at the second node to the third node to turn ON the emission switch.

18. The driving circuit of claim 1, further comprising:
a third transistor, comprising a control terminal, a first terminal, and a second terminal, wherein the control terminal is coupled to the second node, the first terminal receives a set signal, and a second terminal is coupled to the second node; a block transistor, comprising a control terminal, a first terminal, and a second terminal, wherein the control terminal receives the set signal, the first terminal is coupled to the second node, and a second terminal is coupled to a fourth node; and a buffer circuit, coupled between the fourth node and the emission switch, wherein the buffer circuit receives the PWM signal to generate an emission signal at a third node so that the emission switch couples the current to the light emitting unit according to the emission signal.

* * * * *